US007006838B2

(12) United States Patent
Diener et al.

(10) Patent No.: US 7,006,838 B2
(45) Date of Patent: Feb. 28, 2006

(54) SYSTEM AND METHOD FOR LOCATING SOURCES OF UNKNOWN WIRELESS RADIO SIGNALS

(75) Inventors: Neil R. Diener, Rockville, MD (US);
D. Andrew Floam, McLean, VA (US);
Gary L. Sugar, Rockville, MD (US);
David S. Kloper, Mt. Airy, MD (US)

(73) Assignee: Cognio, Inc., Germantown, MD (US)

( * ) Notice: Subject to any disclaimer, the term of this patent is extended or adjusted under 35 U.S.C. 154(b) by 91 days.

(21) Appl. No.: 10/717,317

(22) Filed: Nov. 19, 2003

(65) Prior Publication Data

US 2004/0102198 A1 May 27, 2004

Related U.S. Application Data

(63) Continuation-in-part of application No. 10/409,563, filed on Apr. 8, 2003.

(60) Provisional application No. 60/469,647, filed on May 12, 2003, provisional application No. 60/319,737, filed on Nov. 27, 2002.

(51) Int. Cl.
*H04Q 7/20* (2006.01)
(52) U.S. Cl. .............................. 455/456.1; 455/456.2; 455/457
(58) Field of Classification Search ............. 455/456.1, 455/456.2, 457, 504, 67.11, 67.13, 67.16, 455/115.1, 115.3, 226.1, 226.2, 226.3
See application file for complete search history.

(56) References Cited

U.S. PATENT DOCUMENTS 4,173,760 A 11/1979 Garrison ................. 343/112 R (Continued)

FOREIGN PATENT DOCUMENTS

WO WO 99/19742 4/1999

(Continued)

OTHER PUBLICATIONS

Written Opinion in PCT Appl. No. PCT/US03/10457, filed April 8, 2003.

(Continued)

*Primary Examiner*—Temica Beamer
(74) *Attorney, Agent, or Firm*—Edell,Shapiro&Finnan,LLC

(57) ABSTRACT

A system and method for determining the location of a source (target device) of a wireless radio signal of an unknown or arbitrary type for which a signal correlator is not known or available. The target device's signal is received at a plurality of known locations to generate receive sample data representative thereof at each known location. Receive signal data samples associated with the target device's signal at one of the plurality of known locations is selected to be used as a reference waveform. For example, information concerning the target device's signal received at each known location is compared to determine the known location that best receives it. The receive signal sample data obtained by the known location that best receives the target device's signal is used as the reference waveform. A measurement experiment is run in which the target device's signal is followed or preceded relatively close in time by a transmission of a reference signal. The reference signal and the target device's signal are received at the plurality of known locations. The reference waveform is used to correlate against the received signal data obtained at each known location to determine the time of arrival of the target device's signal. The time difference between arrival of the target device's signal and arrival of the reference signal at each of the known locations is computed. A location of the source of the wireless radio signal is computed based on the time difference of arrival measurements at the plurality of known locations.

40 Claims, 13 Drawing Sheets

U.S. PATENT DOCUMENTS

| | | | | |
|---|---|---|---|---|
| 5,008,679 | A | 4/1991 | Effland et al. | 342/353 |
| 5,191,342 | A | 3/1993 | Alsup et al. | 342/465 |
| 5,594,452 | A | 1/1997 | Webber et al. | 342/343 |
| 5,600,706 | A | 2/1997 | Dunn et al. | 379/59 |
| 5,663,990 | A | 9/1997 | Bolgiano et al. | 375/347 |
| 5,706,010 | A | 1/1998 | Franke | 342/47 |
| 5,719,584 | A | 2/1998 | Otto | 342/465 |
| 5,724,047 | A | 3/1998 | Lioio et al. | 342/442 |
| 5,883,598 | A | 3/1999 | Parl et al. | 455/456 |
| 5,920,287 | A | 7/1999 | Belcher et al. | 342/450 |
| 5,995,046 | A | 11/1999 | Belcher et al. | 342/450 |
| 5,999,129 | A | 12/1999 | Rose | 342/394 |
| 6,018,312 | A | 1/2000 | Haworth | 342/353 |
| 6,031,490 | A * | 2/2000 | Forssen et al. | 342/457 |
| 6,061,343 | A | 5/2000 | son Akertberg | 370/345 |
| 6,069,887 | A | 5/2000 | Geiger et al. | 370/338 |
| 6,088,586 | A | 7/2000 | Haverty | 455/422 |
| 6,121,926 | A | 9/2000 | Belcher et al. | 342/450 |
| 6,185,429 | B1 | 2/2001 | Gehrke et al. | 455/502 |
| 6,201,499 | B1 | 3/2001 | Hawkes et al. | 342/387 |
| 6,243,588 | B1 * | 6/2001 | Koorapaty et al. | 455/456.2 |
| 6,246,884 | B1 * | 6/2001 | Karmi et al. | 455/521 |
| 6,266,014 | B1 * | 7/2001 | Fattouche et al. | 342/450 |
| 6,268,829 | B1 | 7/2001 | Weckstrom | 342/418 |
| 6,275,705 | B1 | 8/2001 | Drane et al. | 455/456 |
| 6,282,426 | B1 | 8/2001 | Wang | 455/456 |
| 6,285,321 | B1 | 9/2001 | Stilp et al. | 342/465 |
| 6,289,280 | B1 | 9/2001 | Fernandez-Corbaton et al. | 701/214 |
| 6,300,905 | B1 | 10/2001 | Chen et al. | 342/458 |
| 6,327,474 | B1 | 12/2001 | Ruutu et al. | 455/456 |
| 6,353,412 | B1 | 3/2002 | Soliman | 342/387 |
| 6,353,744 | B1 | 3/2002 | Wu et al. | 455/456 |
| 6,366,566 | B1 | 4/2002 | Scott | 370/280 |
| 6,393,294 | B1 | 5/2002 | Perez-Breva et al. | 455/456 |
| 6,417,799 | B1 | 7/2002 | Aubain et al. | 342/356 |
| 6,438,380 | B1 | 8/2002 | Bi et al. | 455/456 |
| 6,453,168 | B1 | 9/2002 | McCrady et al. | 455/517 |
| 6,463,287 | B1 | 10/2002 | Wegner | 455/456 |
| 6,473,619 | B1 * | 10/2002 | Kong et al. | 455/456.1 |
| 6,515,623 | B1 | 2/2003 | Johnson | 342/387 |
| 6,546,256 | B1 | 4/2003 | Maloney et al. | 455/456 |
| 6,567,669 | B1 | 5/2003 | Groome | 455/456 |
| 6,618,009 | B1 | 9/2003 | Griffin et al. | 342/432 |
| 6,621,454 | B1 | 9/2003 | Reudink et al. | 342/367 |
| 6,671,514 | B1 * | 12/2003 | Cedervall et al. | 455/456.1 |
| 2001/0033600 | A1 | 10/2001 | Yang et al. | 375/130 |
| 2002/0039080 | A1 | 4/2002 | Wisherd et al. | 342/463 |
| 2002/0115448 | A1 * | 8/2002 | Amerga et al. | 455/456 |
| 2003/0006935 | A1 | 1/2003 | Bay | 342/465 |
| 2003/0045303 | A1 * | 3/2003 | Oda et al. | 455/456 |
| 2003/0050079 | A1 * | 3/2003 | Tsunehara et al. | 455/456 |
| 2003/0064733 | A1 | 4/2003 | Okanoue et al. | 455/456 |
| 2003/0137453 | A1 | 7/2003 | Hannah et al. | 342/387 |
| 2003/0146871 | A1 | 8/2003 | Karr et al. | 342/457 |
| 2003/0220765 | A1 | 11/2003 | Overy et al. | 702/158 |
| 2003/0232598 | A1 | 12/2003 | Aljadeff et al. | 455/41.2 |

FOREIGN PATENT DOCUMENTS

| WO | WO 00/52658 | 9/2000 |
|---|---|---|
| WO | WO 02/41545 A2 | 5/2002 |
| WO | WO 02/41651 A2 | 5/2002 |
| WO | WO 02/054813 A1 | 7/2002 |

OTHER PUBLICATIONS

PCT Search Report from related PCT Appl. No. PCT/US03/10457 filed Apri. 8, 2003.

Harsha Srivatse, "Location Based Security for Wireless Apps," IBM Developer Works, Nov. 19, 2002.

Li et al., "Comparison of Indoor Geolocation Methods in DSSS and OFDM Wireless Lan Systems," VTC, 2000, pp. 3015-3020.

Interlink Networks, "A Practical Approach to Identifying and Tracking Unauthorized 802.11 Cards and Access Points," Interlink Networks, Inc., 2002, pp. 1-25.

Wildpackets Academy Tutorial, "AiroPeek and Wireless Security: Identifying and Locating Rogue Access Points," WildPackets, Inc., 2002, pp. 1-8.

Nerguizian et al., "A Framework for Indoor Geolocation using an Intelligent System," INRS-Telecommunications, 3rd WLAN Workshop, 2001, pp. 1-38.

Ekahau Inc., "Ekahau Positioning Engine TM," Product Literature, #2000-2002.

Eric Griffith, "AirWave & 3eTI Detect Rogues," 80211planet.com news, Oct. 29, 2002.

Jim Geier, "Ekahau's Positioning Engine 2.0" 80211planet.com news, Dec. 20, 2002.

Jim Geier, "Identifying Access Point Installation Locations," 8011planet.com news, Oct. 28, 2002.

PCT Search Report from PCT Appl. No. PCT/US2003/037185.

* cited by examiner

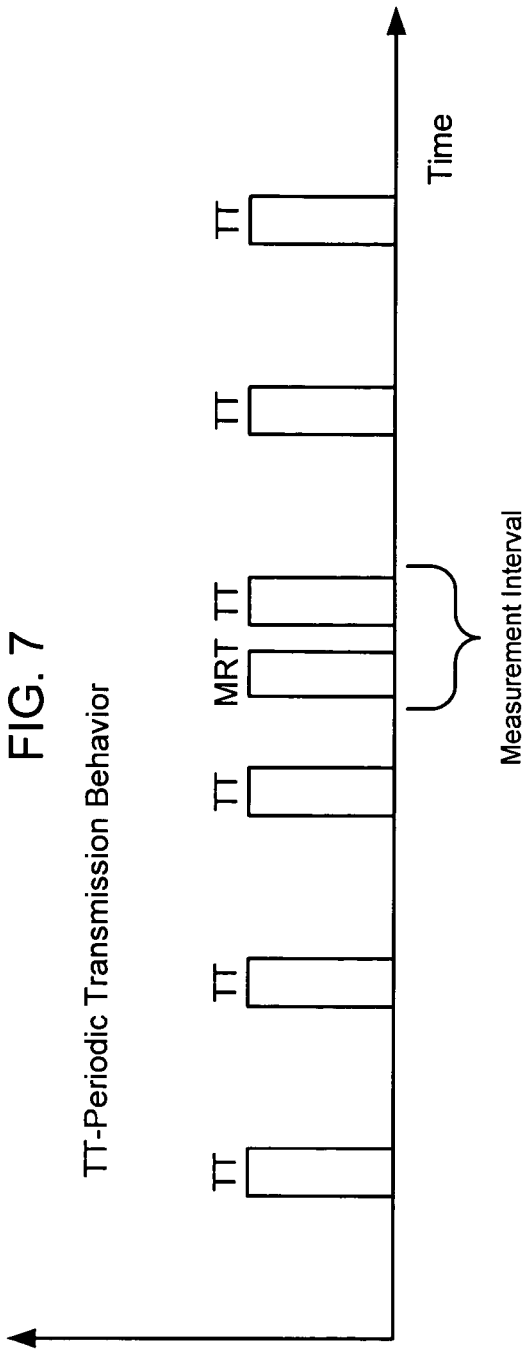

FIG. 9

$$\frac{\partial F_i}{\partial x} = \frac{x - x_i}{\sqrt{(x-x_i)^2 + (y-y_i)^2 + (z-z_i)^2}},$$

$$\frac{\partial F_i}{\partial y} = \frac{y - y_i}{\sqrt{(x-x_i)^2 + (y-y_i)^2 + (z-z_i)^2}},$$

$$\frac{\partial F_i}{\partial z} = \frac{z - z_i}{\sqrt{(x-x_i)^2 + (y-y_i)^2 + (z-z_i)^2}}$$

$$J(x, y, z, t) = \begin{bmatrix} \frac{\partial F_1}{\partial x} & \frac{\partial F_1}{\partial y} & \frac{\partial F_1}{\partial z} & c \\ \frac{\partial F_2}{\partial x} & \frac{\partial F_2}{\partial y} & \frac{\partial F_2}{\partial z} & c \\ \frac{\partial F_3}{\partial x} & \frac{\partial F_3}{\partial y} & \frac{\partial F_3}{\partial z} & c \\ \frac{\partial F_4}{\partial x} & \frac{\partial F_4}{\partial y} & \frac{\partial F_4}{\partial z} & c \end{bmatrix}$$

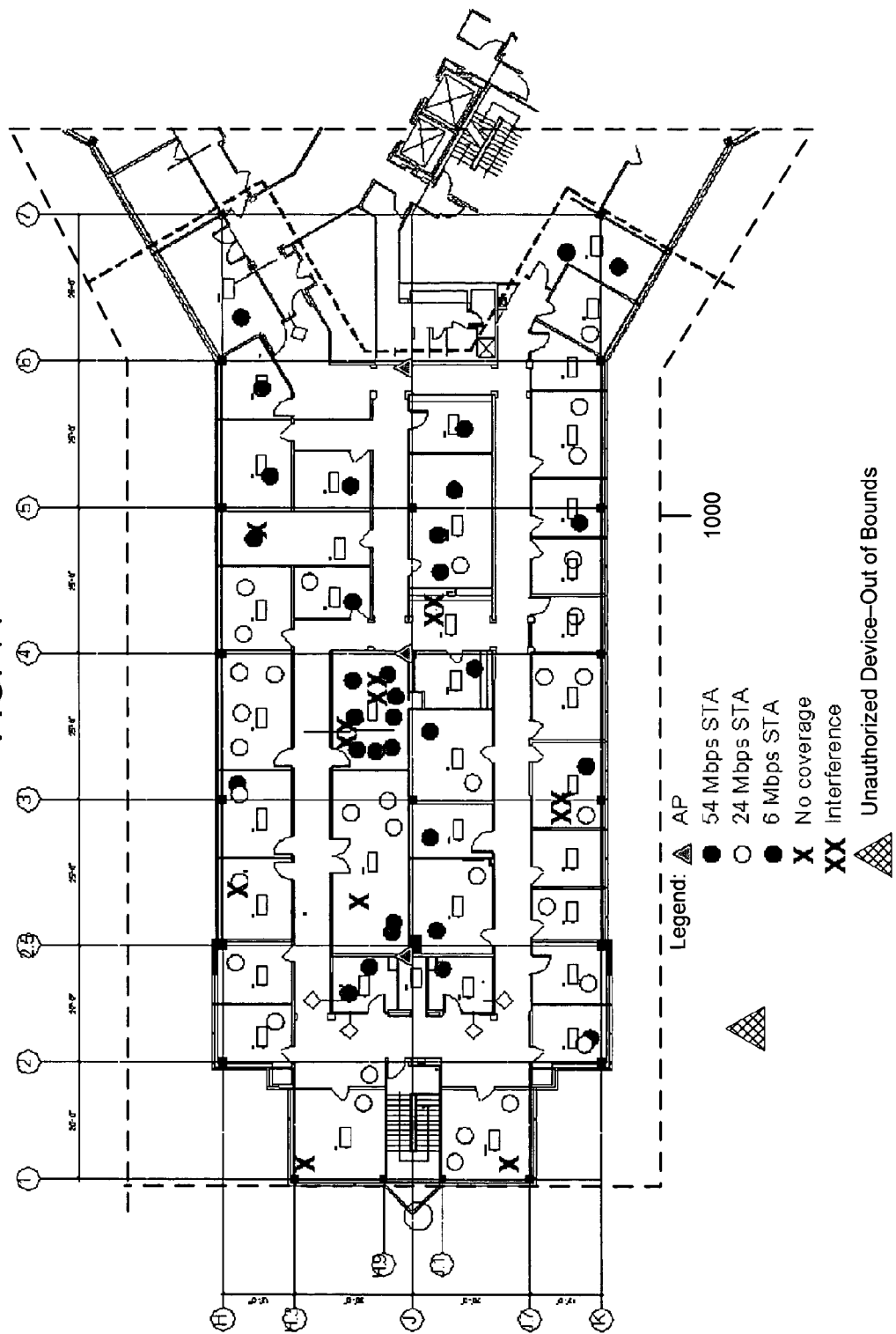

SYSTEM AND METHOD FOR LOCATING SOURCES OF UNKNOWN WIRELESS RADIO SIGNALS

This application claims priority to U.S. Provisional Application No. 60/469,647 filed May 12, 2003 and to U.S. Provisional Application No. 60/319,737 filed Nov. 27, 2002, is a continuation-in-part of U.S. application Ser. No. 10/409,563, filed Apr. 8, 2003. The entirety of each of these applications is incorporated herein by reference.

BACKGROUND OF THE INVENTION

Radio location measurement techniques are known in the art. Many of these techniques require one or more of: recognition of special location signals, dedicated and cost-additive hardware resources, and higher speed processing in what is preferred to be a lower cost wireless device. The aforementioned co-pending non-provisional application is directed to location measurement techniques that do not require that measurements at each known location be time-synchronized.

It is possible that in the frequency band and locality where radio communication operation is occurring, an interfering signal source may be activated which can affect the performance of some desired radio communication, such as an IEEE 802.11 wireless local area network (WLAN). In this case, it would be desirable to locate that signal source in order to investigate it further and/or re-position other radio communication devices around it. However, if the transmissions of the signal source are not of a known type, current location measurement techniques are not readily applicable.

Techniques are needed to locate the source of a signal that is of an unknown or arbitrary type, such as sources of signal transmissions for which a signal correlator is not known or available.

SUMMARY OF THE INVENTION

Briefly, a system and method are provided for determining the location of a source (target device) of a wireless radio signal of an unknown or arbitrary type for which a signal correlator is not known or available. The wireless radio signal transmitted by the target device is received at a plurality of known locations to generate receive sample data representative thereof at each known location. Receive signal data samples associated with the wireless radio signal at one of the plurality of known locations is selected to be used as a reference waveform. For example, data concerning the reception of the wireless radio signal at each known location is compared to determine the known location that best receives it. The receive signal data samples obtained at the known location that best receives the target device signal is used as the reference waveform. A variety of criteria may be used to select the receive signal data samples to be used as the reference waveform. A measurement experiment is run in which the target device's signal is followed or preceded relatively close in time by a transmission of a reference signal. The reference signal and the target device's signal are received at the plurality of known locations. The reference waveform is used to correlate against the received signal data obtained at each known location to determine the time of arrival of the target device's signal. The time difference between arrival of the target device's signal and arrival of the reference signal at each of the known locations is computed. A location of the target device is computed based on the time difference of arrival measurements at the plurality of known locations.

Other objects and advantages of the present invention will become more readily apparent when reference is made to the following description in conjunction with the accompanying drawings.

BRIEF DESCRIPTION OF THE DRAWINGS

FIGS. 7 and 8 are timing diagrams illustrating techniques to locate target terminals that do not necessarily obey the same communication protocol rules as a master reference terminal (MRT).

FIG. 9 is a diagram illustrating the equations used to compute the location of a terminal using time difference of arrival measurements.

FIG. 14 is a diagram showing an exemplary coverage map of a wireless network that can be created using the techniques described herein.

DETAILED DESCRIPTION OF THE DRAWINGS

The Location Measurement Process Generally

Figure 1:
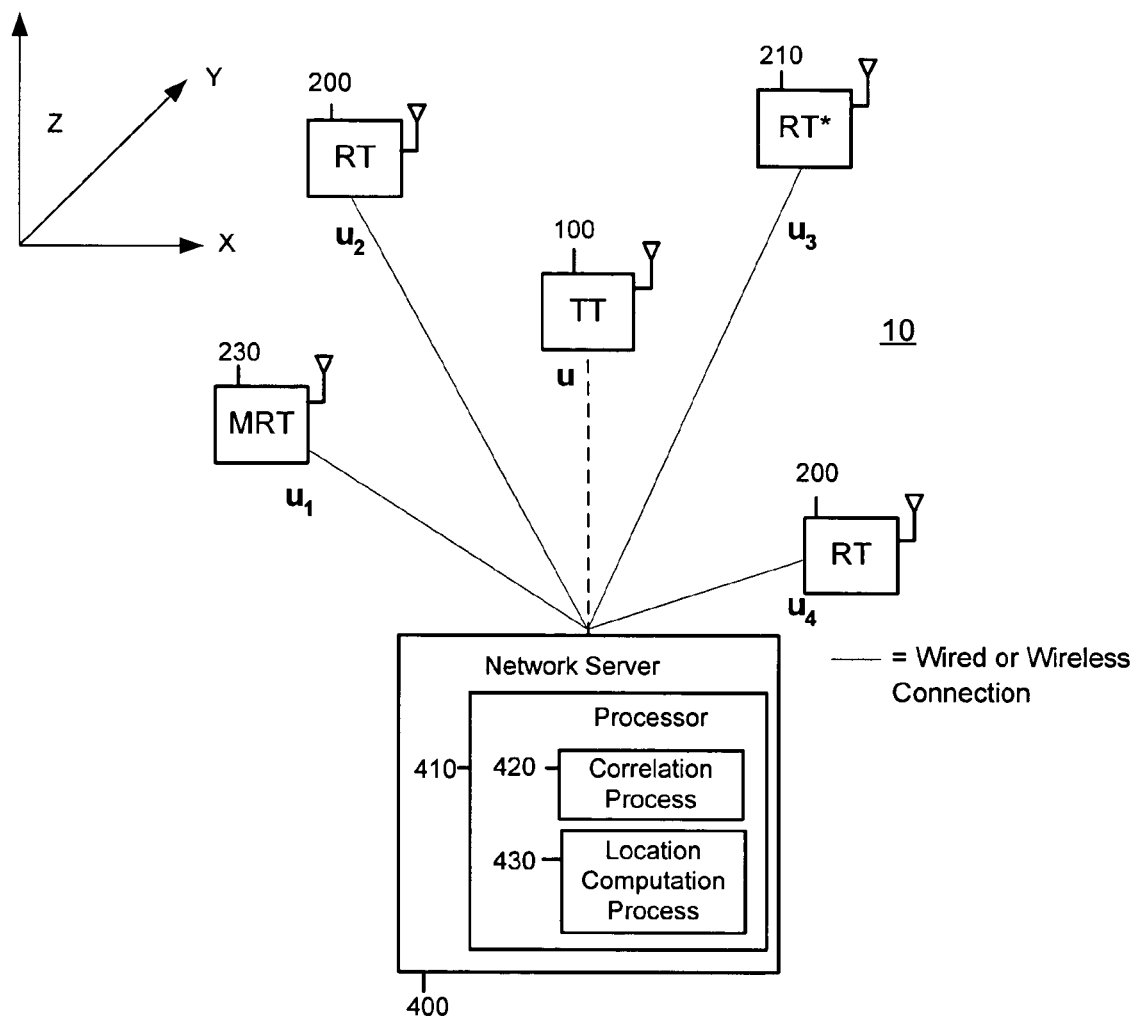
FIG. 1 is a block diagram of a wireless environment in which location measurement may be useful.

FIG. 1 illustrates a wireless radio environment 10 having multiple terminals. The environment 10 may be, for example, an IEEE 802.11 WLAN, and the terminals may be access points (APs) or stations (STAs). It is useful to know the location of various terminals for security and other network management reasons. A rogue device (STA or AP) may attempt to access the network, and if so, it would be desirable to locate it. Alternatively, the device to be located may be a non-WLAN device, such as a cordless phone, microwave oven, Bluetooth™ device, or even a device of an unknown type etc., that operates in the same frequency band as the WLAN terminals, potentially interfering with the WLAN operation. It would be desirable to locate an interfering device.

In FIG. 1, a target terminal (TT) 100 is the device (also called a target device) whose location u is to be measured. There are one or more reference terminals (RTs) 200, 210 and 220 (e.g., AP or STA) each at a known location $u_i=[x_i,$ $y_i, z_i$]), and a master reference terminal (MRT) 230 (e.g., AP or STA) at a known location $u_1$). Alternatively, as will be described hereinafter, the known location may consist of one antenna of a multi-antenna RT. A computing device, such as a network server (NS) 400, is coupled to each RT using a wired network connection or a wireless network connection directly or through one of the other terminals (such as the MRT 230) that may also act as an AP.

Generally, the location measurement process involves using time difference of arrival (TDOA) measurements at two or more known locations. Any terminal at a known or unknown location in the general proximity of the TT transmits a first radio signal. For example, the MRT 230 transmits a first (radio) signal. The TT 100 transmits a second (radio) signal. The first signal may be transmitted before or after the second signal. The arrival of the first signal and the second signal at two or more known locations (e.g., RTs including the MRT 230) is determined and a time difference is computed for each known location. The TDOA measurements are then used to compute the location of the TT 100. The advantage of this process is that the clocks of the various devices used for measurement do not need to be synchronized, which in many cases would require additional hardware or software processing. Moreover, it is possible, but not required, to execute the computations performed by the location process entirely in non-real-time using software. This process may be performed in an indoor or outdoor wireless radio environment.

The locations of the MRT 230 and RTs 200, 210 and 220 are known through a priori knowledge, such as by physical measurement, through the use of global positioning systems (GPS) or through the use of the techniques described herein.

In the aforementioned co-pending and commonly assigned applications it was assumed that the TT transmitted a signal of a known type for which the RTs and/or NS had a correlator available to correlate to it in order to precisely determine time of arrival of the TT's signal, for computing the TDOA measurements. However, the TT's signal may be unknown to the RTs such that they do not have a correlator available to correlate to it. As is known in the art, signal correlators are used to precisely determine the occurrence of a particular type of signal, and as such are useful to precisely determine time of arrival of a signal (or of some reference point in that signal). Techniques are provided herein to locate sources of radio signals in which the devices used in the measurement process do not have a signal correlator or correlation process for the TT signal used in the measurement process. For example, the TT may be a completely rogue or unknown device, or the TT may be a device of a generally known type transmitting a signal with a known modulation type, but the TT is transmitting one or more signals (packet, frame or message types, etc.) for which the RTs do not have a correlator.

The NS 400 is a computing device (e.g., PC, server computer, etc.) that comprises a processor 410 and executes a location computation process 430 described hereinafter. The NS 410 may also execute a correlation process 420 that is described hereinafter. The correlation process 420 determines the time of arrival measurements of the various signals, and may also compute the TDOA data from the time of arrival data, or the TDOA computation is performed by a separate process. The location computation process 430 uses the TDOA data to compute the location of the TT 100. The correlation process for data collected at each of several RTs 200, 210 and 220 may be executed in the NS 400, or may be executed in the RTs 200, 210 and 220 themselves on an embedded or hosted processor. In any case, the computations that the RTs and/or NS perform may be done entirely in software and in non-real-time, saving significant costs in silicon area which would otherwise be required in a terminal device. The TDOA measurements may be computed by cross-correlating the received waveform with a very long reference waveform. Noise averaging due to a long correlator enhances the measurement SNR, but does not increase the silicon area/device cost since the correlator is implemented in software. An advantage of using a computing resource (and software) that may have greater processing capability than any of the RTs to perform the correlation process 420 and the location computation process 430 is that the RTs can be very inexpensive radio receiver devices, in a most basic form. In addition, the signals received by the RTs can be relatively weak because the correlation process 420 applied to that data can be powerful enough (since it can be executed on a computer, e.g., NS) to extract the important time of arrival information from the captured data at each RT. However, any RT (such as the MRT) that has sufficient processing capability may perform the correlation and even location measurement computations. The data or measurements at the other RTs would be sent to that RT.

One or more of the RTs 200, 210 and 220 and the MRT 230 shown in FIG. 1 have the capability of capturing and storing in a memory receive signal data output by the radio receiver of the device beginning at a specified time and for a specified time period. Terminals having this capability are hereinafter referred to as "collaborative" devices or terminals, and terminals that do not have this capability are referred to as non-collaborative devices or terminals.

The number of required time difference of arrival measurements at different known locations depends on the availability of other factors, but in general, measurements need to be made at at least two known locations. Table 1 below shows the number of measurements that are needed depending on other factors, such as whether one coordinate of the TT is known or the TT is a collaborative device. In all of the cases identified in the table below, there will be location ambiguity because the equations that are solved for the location computations will yield two solutions. The correct one of the two solutions needs to be chosen.

As described hereinafter, there are at least two options to deal with this location ambiguity. First, a TDOA can be taken at an additional known location (e.g., RT). Second, a hypothesis test can be performed to identify the correct location solution. Examples of hypothesis tests are described hereinafter in conjunction with FIG. 10.

TABLE 1

Minimum Number of Known Locations for Locating a TT Given Other Factors

| Know One Coordinate (e.g., z) | Collaborative TT | Minimum Number of Known Locations (e.g., RTs) |
|---|---|---|
| X | X | 2 |
| X |   | 3 |
|   | X | 3 |
|   |   | 4 |

Figure 2:
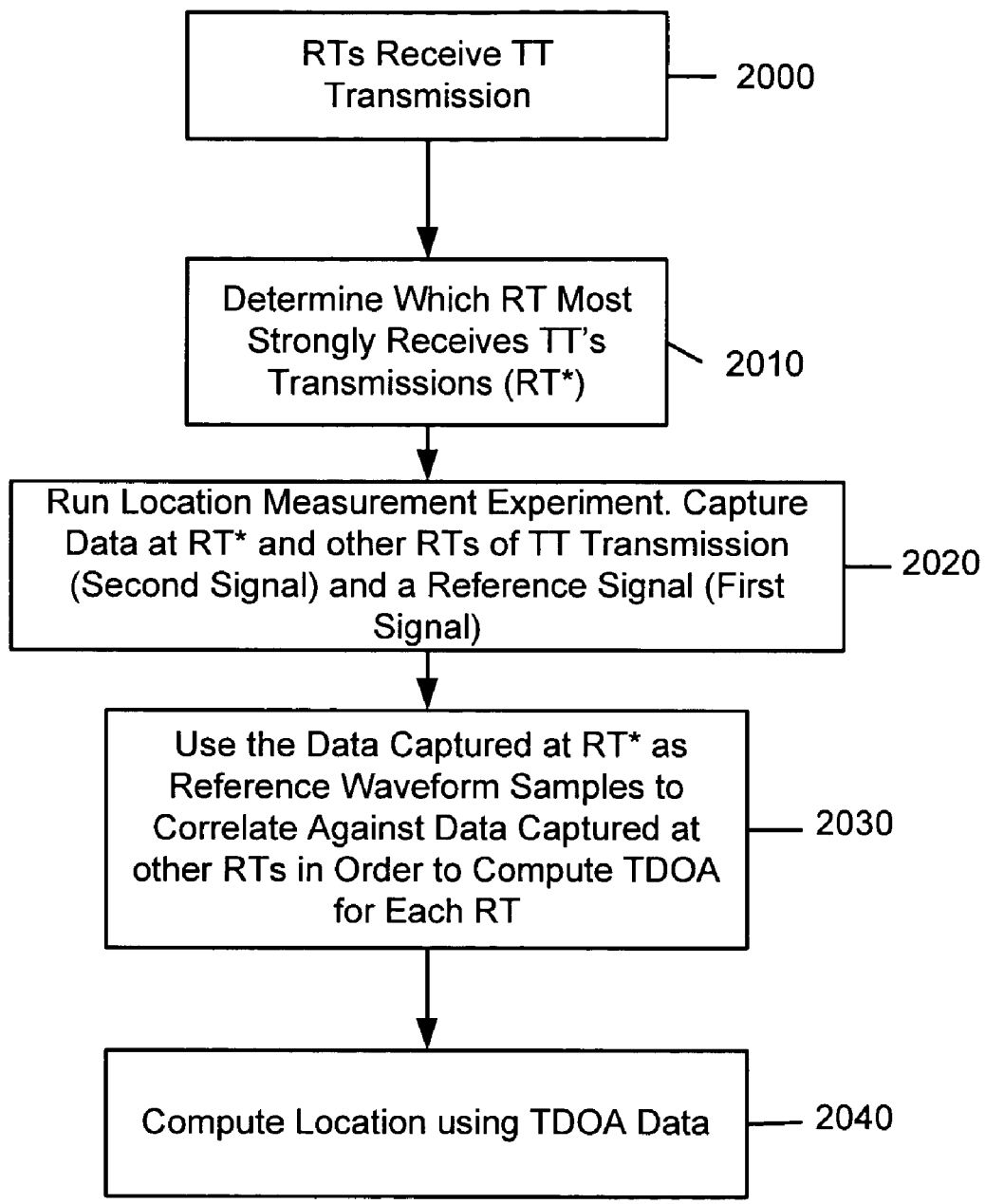
FIG. 2 is a flow chart for a procedure to locate a source of a wireless radio signal for which a correlator is not known or available.

Turning to FIG. 2, a flow chart is shown for a process useful when the TT 100 has been transmitting and from its transmissions, the RTs or NS (after processing data captured by the RTs) have determined that the TT signal is a type for which the RTs or NS do not have a signal correlator that can be used to precisely determine time of arrival of the TT signal. In step 2000, the RTs that are in sufficient proximity to the TT 100 will receive the TT's transmission. The RTs will generate information describing the received TT transmission, such as signal pulse characteristics, including pulse power (signal strength), pulse bandwidth, pulse center frequency, pulse duration, etc. An example of a component capable of generating this information is described hereinafter. The RTs will transmit some or all of the TT-descriptive information (or alternatively the captured data itself) to the MRT and or NS. In step 2010, the MRT or NS will compare the TT-descriptive information (or raw captured data) of each RT to determine which RT likely captures the best sampled data of the received TT signal. The best sampled data may be the one that has one or more of the greatest received signal strength or power, longest duration, widest bandwidth, etc. That RT is designated RT* and the samples it obtains of received TT signals is used to as a reference waveform to determine time of arrival of the TT signal at each RT.

Once RT* has been designated, in step 2020, a location measurement procedure is run. The NS or NRT may determine based on observed activity of the TT that it transmits periodically. If the TT transmits periodically, the NS or MRT can predict when the next TT transmission will occur and send a signal to the RTs to alert them of the time and duration of an impending location measurement experiment. The MRT will then transmit a first signal just prior to or after the TT transmission in order to allow the RTs to receive both the first signal and the TT's signal (the second signal) and capture data related to their reception of each signal.

If the TT is determined to be an aperiodic transmitter, then there are several ways of capturing sufficient data. A first method is for the NS to command the MRT to perform a trial and error process whereby the MRT alerts the RTs to begin capturing data periodically for a certain time duration, and the NRT will transmit a first signal on that periodic basis in order to attempt to capture a TT transmission after the first signal. The RTs will come up periodically and receive energy to capture data that includes the MRT's first signal and eventually the TT's second signal thereafter.

A second technique is to alert the RTs to capture data in response to, and for a time duration following, detecting the TT's signal. This would involve the RTs triggering by received signal strength of the TT's signal, and using a mark some time period into the TT's signal as a reference point. The MRT would transmit the first signal periodically and its arrival would also be captured at the RTs during this time period.

A third technique is for the NS or MRT to put the RTs in a continuous capture mode whereby the RTs store sample data continuously (in a circular buffer) and stop storing once they detect the MRT's signal. The data captured at the RTs would eventually include arrival of the TT's signal as well as arrival of the MRT's signal, sufficient to generate TDOA data.

Another technique for setting up and executing the location operation is as follows. The NS 400 sends a set-up message to each of the RTs 200 and 210 that are to be used in the location process. The set-up message will include the address of the MRT 230, the frequency channel to be used for the location operation and information advising the MRT 230 to configure the pulse detector(s) in its SAGE block to generate a trigger signal upon detecting the TT's signal. The MRT 230 and RTs 200 and 210 will configure themselves, and send a ready signal to the NS 400 or MRT 230.

In response to detecting the TT signal, the MRT 230 transmits a Probe Request frame (a frame that is part of the IEEE 802.11 communication standard) or another frame that can be uniquely identified by each RT in their snapshot buffers. In doing so, the MRT 230 will compute the time delay between receiving the TT signal and sending the Probe Request frame. The RTs 200 and 210 will be continuously capturing receive signal data and will use the Probe Request frame data in the snapshot buffer as a marker for where to look back in the buffer for the TT signal. The RTs 200 and 210 will terminate further capturing of data a short period of time later upon detecting the Probe Request frame. The MRT 230 will send the time delay information it computed to the RT 200 and 210 so that the RTs can use it to locate the TT signal in their buffers with respect to the Probe Request frame.

Using a suitable reference waveform for the TT signal as described above in conjunction with FIGS. 2 and 3, the MRT 230 and RTs 200 and 210 will determine the time of arrival of the TT signal and the time of arrival of the Probe Request frame, and from that information compute the TDOA between the signals. The MRT and RTs will send the TDOA data to the NS 4000, where the location is computed based on the TDOA data, or if preferable, the MRT may compute the location based on the TDOA data.

Once the location measurement experiment has been run in step 2020 and the RTs have captured data representing reception of the first and second signals, the data is processed in step 2030 to generate the TDOA data for each RT. The reference waveform samples captured at RT* are used to correlate or compare against the data captured by the other RTs for the received second signal to determine time of arrival of the TT signal at each RT.

In step 2030, the RT* may send the reference waveform samples to each RT (or the NS may distribute the reference waveform samples to each RT) to enable each RT to correlate against captured receive signal data from the second signal to generate the TDOA data. Each RT would already have a correlator to correlate to the first signal from the MRT, or the NS would perform that correlation. For example, the first signal is an IEEE 802.11 frame, such as a request-to-send (RTS) frame or a probe request frame which all of the RTs are capable of receiving and recognizing assuming they are all compliant with the IEEE 802.11 standard. Alternatively, each RT may send its captured data for the second signal to the NS to allow the NS to correlate against the captured data for the second signal using the reference waveform samples obtained from the RT* in order to generate the TDOA data (after determining the time of arrival of the first signal computed by the corresponding RT or by the NS). The latter case requires that each RT sends all of its captured data to the NS, whereas the former case requires that the NS or RT* send the reference waveform samples to each is RT to perform the correlation and compute the TDOA data.

In step 2040, the location of the TT is computed using the TDOA data obtained by each RT.

It is possible that the location measurement process may be repeated several times (using the same or different RT as RT*) in order to obtain an accurate location measurement for the TT.

Figure 3:
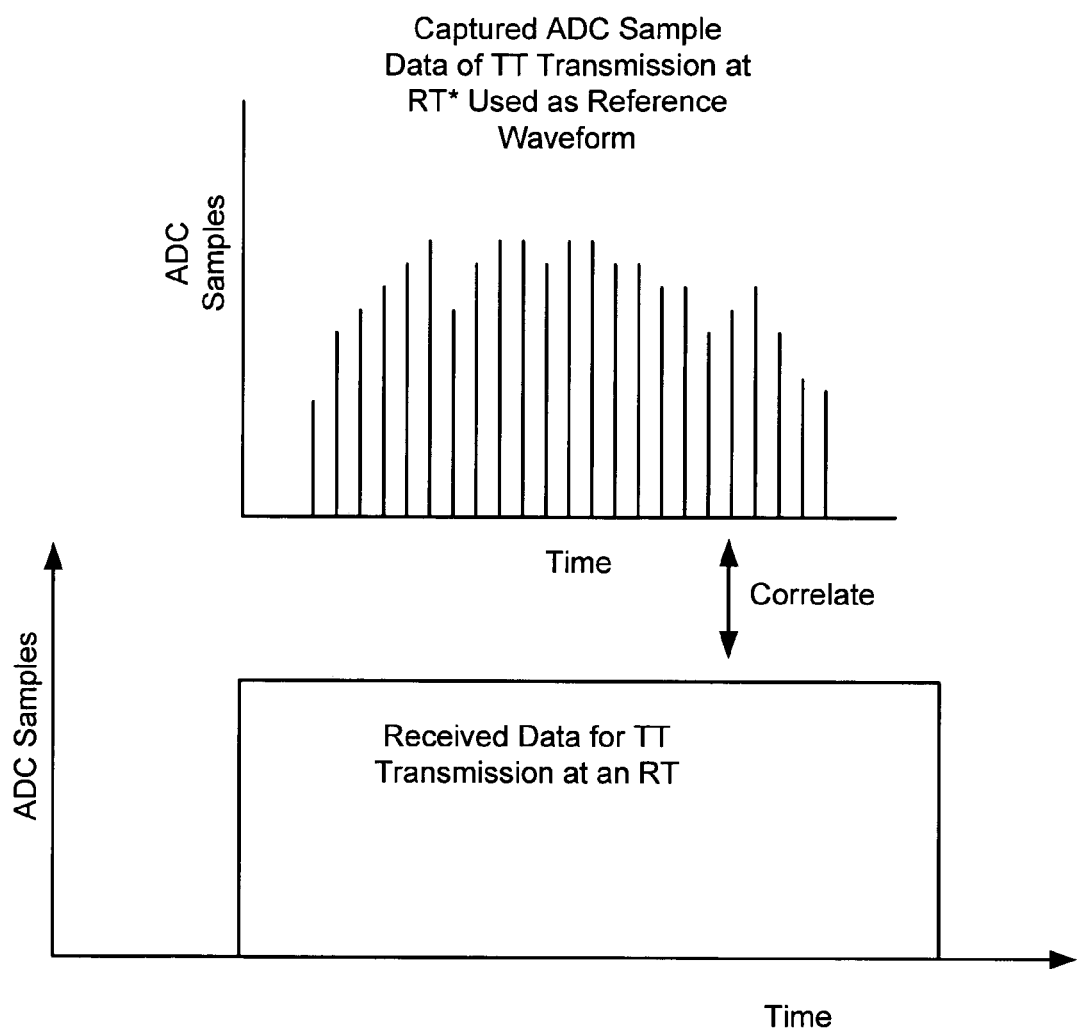
FIG. 3 is a diagram that shows how receive signal samples of the wireless radio signal at a terminal are used as a reference waveform to correlate against the received wireless radio signal at other reference terminals.

FIG. 3 illustrates an example of the reference waveform samples generated by RT*. The output digital sample data from an analog-digital-converter in RT* for energy received for a TT transmission may resemble something like the graph shown in FIG. 3. The reference waveform samples are compared against the received signal samples to determine time of arrival of the TT signal (and ultimately TDOA between the first and second signals). The time of arrival of the TT signal may be with respect to a subset of samples of the received waveform determined to be distinguishable and easily identifiable. For example, a marker or reference point may be identified in the samples to select a subset of the entire waveform sample set, such as samples for a 100 µsec time period portion of the entire waveform. On the other hand, the data samples of the entire received TT transmission can be used for correlation.

As an alternative, if the baseband modulation of the TT's signal is known (but a correlator for the particular packet type sent by the TT is not), RT* may demodulate the received TT transmission to obtain the recovered data. RT* may send the recovered data to the other RTs (or to the NS which in turn sends it to the other RTs) which re-modulate it to produce the reference waveform samples used to correlate against the captured data of the TT.

Exemplary Collaborative Devices

Figure 4:
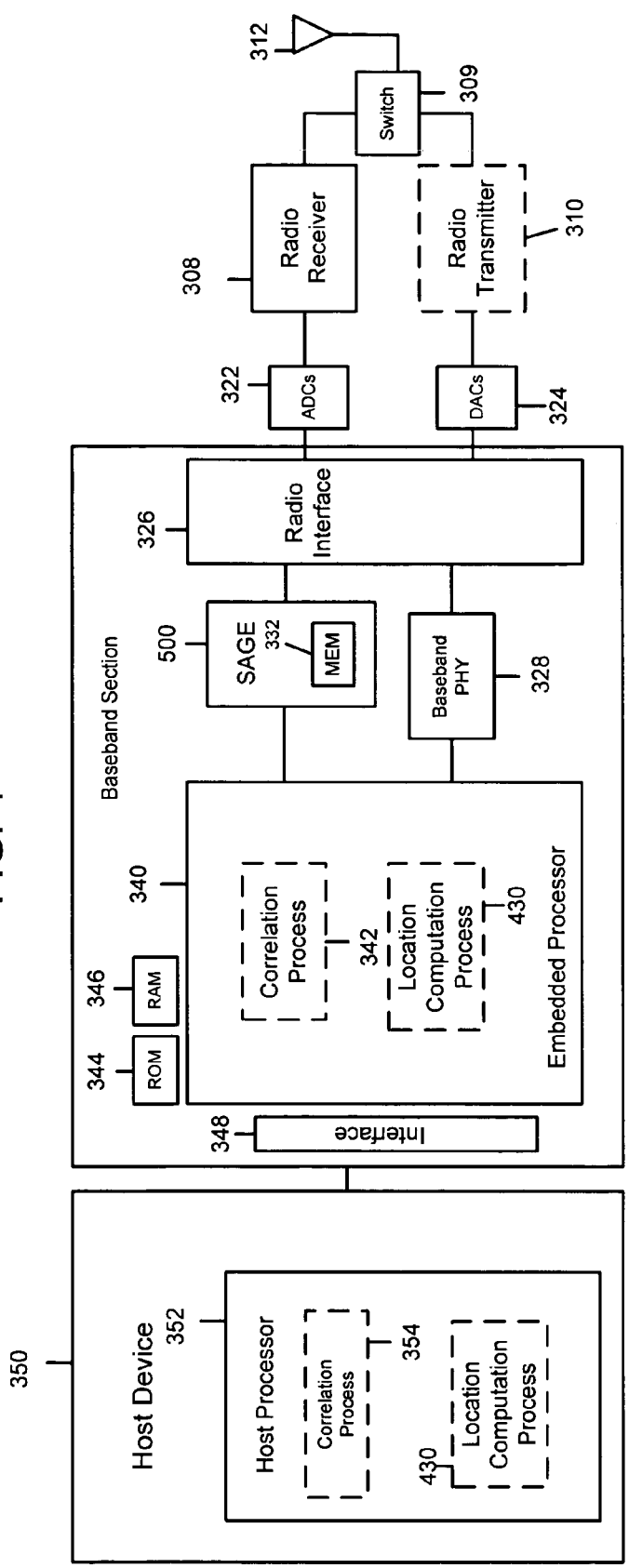
FIG. 4 is an exemplary block diagram of a terminal that is useful in the location measurement techniques described herein.

FIG. 4 is a block diagram of an exemplary RT or MRT. Any device that has an analog-to-digital converter (ADC) and access to its digital output, or access to the analog output of the receiver portion of the radio receiver may be made a collaborative device, insofar as the receiver output can be digitized and stored for the time interval(s) of interest.

The terminal includes a radio receiver 308 that receives signals via an antenna 312. An MRT (and the RTs as well) may have the ability to transmit and receive and therefore may have a radio transmitter 310 (which may be part of a radio transceiver that integrates the radio receiver and radio transmitter). A switch 309 may couple the radio receiver or radio transmitter 310 to the antenna 312. A baseband section 320 (which may be a separate integrated circuit) may be coupled to the ADCs 322 and DACs 324 via an RF interface 326. Baseband signal processing may be performed in a baseband physical block (PHY) 328 in firmware. A memory 332 is provided that is coupled to receive the digital output of the ADC 322 and may be any storage element or buffer memory capable of storing output of the ADC 322. It need not reside in the baseband section 320 proper. The memory 332 should be large enough to store at least a portion of a first signal sent by the MRT and a portion of a second signal sent by the TT, as well as other miscellaneous information in the time interval between the signals. Examples of these signals are described further hereinafter. In the case where the terminal is the MRT 230, the memory 332 may store the digital input samples to the DAC 324 that are used to transmit a first signal (in order to identify a reference time point of the first signal), as well as the digital output samples of the ADC 322 representing a received second signal (in order to identify a reference time point of the second signal). The memory 332 may be part of a real-time spectrum analysis engine component called the SAGE 500. The SAGE 500 is described in more detail hereinafter in conjunction with FIG. 5.

Higher level processing capability may be provided in an embedded processor 340 that executes, among other functions, a correlation process 342 like the one referred to above that may be performed by the NS. The embedded processor 340 may execute instructions stored in a ROM 344 and/or RAM 346.

The baseband section 320 may be coupled to a host device 350 via a suitable interface 348, such as a universal serial bus (USB), PCI/Cardbus, or even an Ethernet connection/port. The host device 350 has a host processor 352 that may also execute, among other functions, a correlation process 354. The correlation process 354 in the host device 350 is the same as the correlation process 342 in the embedded processor 340 which is the same as the correlation process 420 in the NS 400. It need not be performed in all locations, but only in one of these locations. The correlation process 354 (342 or 420) is the process that uses the reference waveform (determined as described above in conjunction with FIGS. 2 and 3) for determining time of arrival of the TT signal. In most cases, a signal correlator will be available and used in the correlation process 354 (342 or 420) for the first signal.

A further variation is shown in FIG. 4 in which the RT may have the capability to execute the location computation process 430 in its embedded processor 340 or hosted processor 352 using the TDOA information obtained locally and collected (by wired or wireless link) from other RTs.

Figure 5:
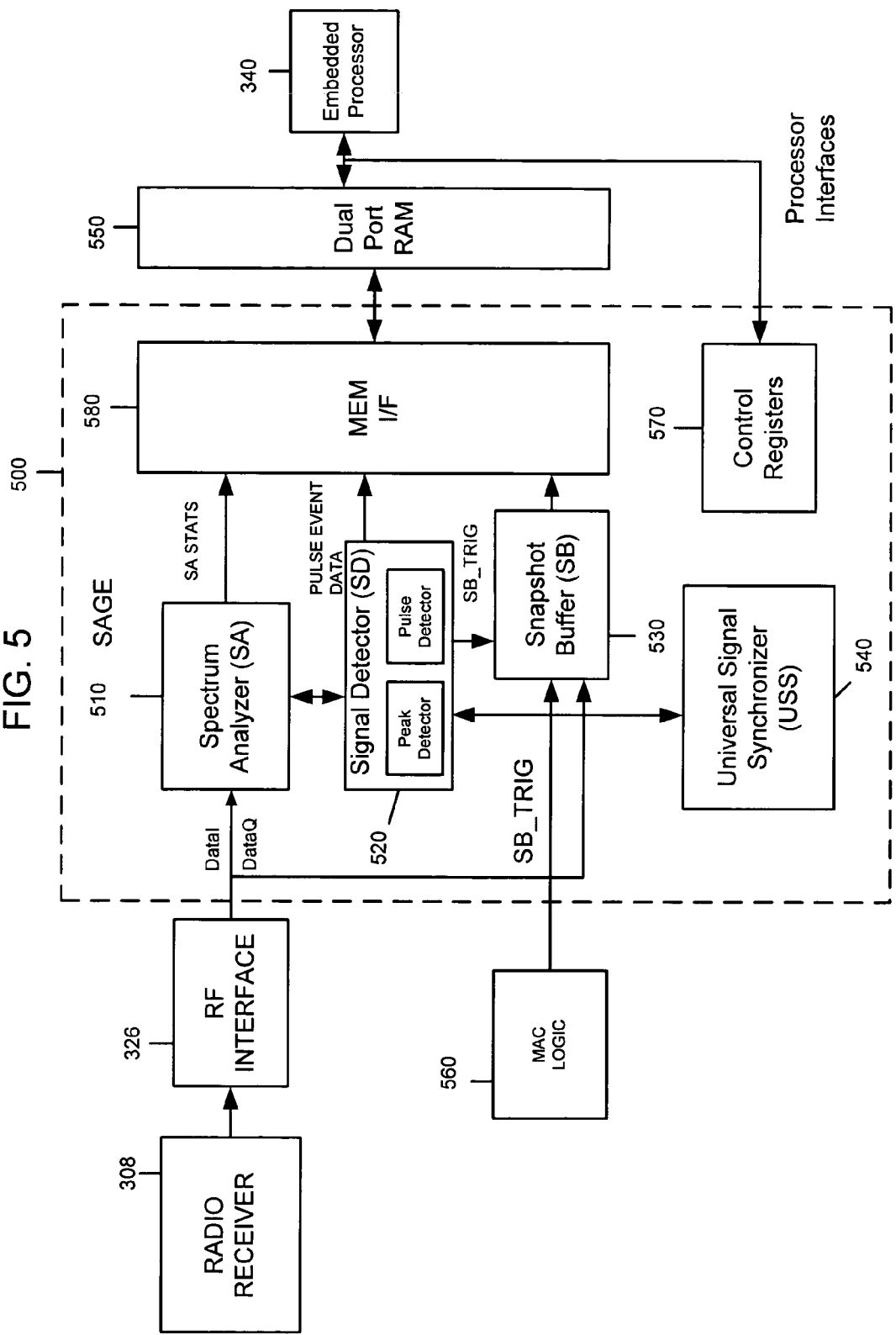
FIG. 5 is a block diagram of a component useful in a terminal, where the component has a memory to store data useful in the location measurement techniques described herein.

One example of a system that includes a memory useful in a terminal to make it collaborative is a real-time spectrum analysis engine (SAGE) 500 shown in FIG. 5. Moreover, the SAGE 500 has the capability of generating characteristics of received signals that can be supplied to the NS by each RT to determine which RT should be considered RT*. The SAGE 500 comprises a spectrum analyzer 510, a signal detector 520, a snapshot buffer 530 and a universal signal synchronizer 540. The SAGE 500 receives digital data representing the output of an ADC (which may be included in the RF interface 326). The spectrum analyzer 520 generates data representing a real-time spectrogram of a bandwidth of radio frequency (RF) spectrum, such as, for example, up to 100 MHz. The output of the SA 520 may comprise power values for each of a plurality of frequency bins that spans a portion or substantially the entire frequency spectrum of interest.

The signal detector 520 detects signal pulses in the frequency band that satisfy a set of configurable pulse characteristics and outputs pulse event data for those detected pulses. The pulse event data may include one or more of the start time, duration, power, center frequency and bandwidth of each detected pulse. The signal detector 520 also provides pulse trigger outputs which may be used to enable/disable the collection of information by the snapshot buffer 530. The signal detector 520 may include one or more pulse detectors each configured to detect pulses that satisfy a certain set of criteria. The signal detector 520 may comprise a peak detector that detects power level above a certain threshold in a frequency bin of data output by the spectrum analyzer 510, and a pulse detector coupled to the peak detector that detects from the peak information pulses that meet the configured criteria. The pulse event data output by the signal detector may be useful in determining the periodic or aperiodic nature of a signal whose source is to be located, or to classify by type (frequency hopper, cordless telephone, Bluetooth™, IEEE 802.11x, infant monitor, unknown, etc.) of signal to be located. Knowing the type of the signal to be located, or at least its transmit behavior, can be useful in deciding on what type of signaling process to use in order to obtain TDOA measurements to locate the source of the signal. Examples of signal classification techniques are described in commonly assigned and co-pending U.S. application Ser. No. 10/246,364, filed Sep. 18, 2002, entitled "System and Method for Signal Classification of Signals in a Frequency Band," U.S. application Ser. No. 10/420,362, filed Apr. 22, 2003 and entitled "System and Method for Classifying Signals Occurring in a Frequency Band," and U.S. application Ser. No. 10/628,603, filed Jul. 28, 2003 and entitled "System and Method for Classifying Signals Using Timing Templates, Power Templates and Other Techniques."

Thus, the signal detector 520 and spectrum analyzer 510 may be used to provide characteristic information of signals occurring in the frequency band, such as transmission of a TT. Each RT may send data describing these characteristics to the NS to allow the NS to determine which RT should be designated RT*.

The snapshot buffer 530 is a memory that stores a set of raw digital receive data which is useful for the reasons described above. The snapshot buffer 530 operates in a circular buffer fashion can be triggered to begin sample collection by either the signal detector 520 or from an external trigger source using the snapshot trigger signal SB_TRIG. Furthermore, the snapshot buffer 530 has two modes of operation: pre-store mode and post-store mode. In a pre-store mode, the snapshot buffer 300 writes continuously to the DPR 550 and stops writing and interrupts the embedded processor 340 when a snapshot trigger signal is detected. In a post-store mode, the DPR write operation begins only after a trigger is detected. A combination pre- and post-store scenario may be created to capture samples of the receive data signals both before and after a snapshot trigger condition. Thus, the snapshot buffer 530 is an example of a controllable memory device that can store raw ADC data samples associated with received TT transmissions at an RT. Each RT may send these samples to the NS to allow the NS to determine which RT should be RT*, together with (or without) signal characteristic information that can be generated by the spectrum analyzer 510 and signal detector 520.

The universal signal synchronizer 540 synchronizes to periodic signal sources, such as Bluetooth™ SCO headsets and cordless phones. The USS 540 interfaces with medium access control (MAC) logic 560 that manages scheduling of packet transmissions in the frequency band according to a MAC protocol, such as, for example, the IEEE 802.11 protocols. The MAC logic 560 may generate the snapshot trigger signal SB_TRIG upon detecting a particular signal, such as the first signal transmitted by the MRT (e.g., an RTS) based on what the MAC logic 560 processes. This may be a useful feature for the location measurements techniques described herein, but it is not required.

The embedded processor 340 interfaces with the SAGE 500 to receive spectrum information output by the SAGE 500, and to control certain operational parameters of the SAGE 500. The embedded processor 340 interfaces with SAGE 500 through the DPR 550 and the control registers 570. The SAGE 500 interfaces with the embedded processor 340 through a memory interface (I/F) 580 that is coupled to the DPR 550.

To summarize, the SAGE 500 is a sub-system useful in a radio device to perform pulse level analysis of energy detected in a radio frequency band. One feature of the SAGE 500 is to capture raw receive signal data in a memory (e.g., snapshot buffer). The snapshot trigger signal that causes the memory to store data may be supplied by a suitably configured pulse detector forming a part of the signal detector component of the SAGE 500 (that is responsive to a signal pulse representative of the occurrence of the first signal), or from MAC logic that tracks the MAC protocol activity associated with signals communicated between devices in the frequency band and detects occurrence of the first signal. Further details on the SAGE 500 are disclosed in commonly assigned co-pending U.S. application Ser. No. 10/246,365, filed Sep. 18, 2002, entitled "System and Method for Real-Time Spectrum Analysis in a Communication Device," and in commonly assigned co-pending U.S. application Ser. No. 10/420,511, filed Apr. 22, 2003, entitled "System and Method for Real-Time Spectrum Analysis in a Radio Device," the entirety of both of which is incorporated herein by reference.

The Location Measurement Process in More Detail

The location measurement process involves transmitting a first signal (also called the reference signal), that may be an outbound signal, from a terminal in the general proximity of the TT. The first signal may be transmitted by the MRT at a known location, but may be transmitted also from a terminal whose location is not known. TDOA measurements are computed between some reference point of the first signal and some reference point of the second signal (the wireless radio signal transmitted by the target device) at each of the known locations (e.g., at least two RTs, one of which may be the MRT). This time difference of arrival information is used to compute the location of the TT.

Figure 6:
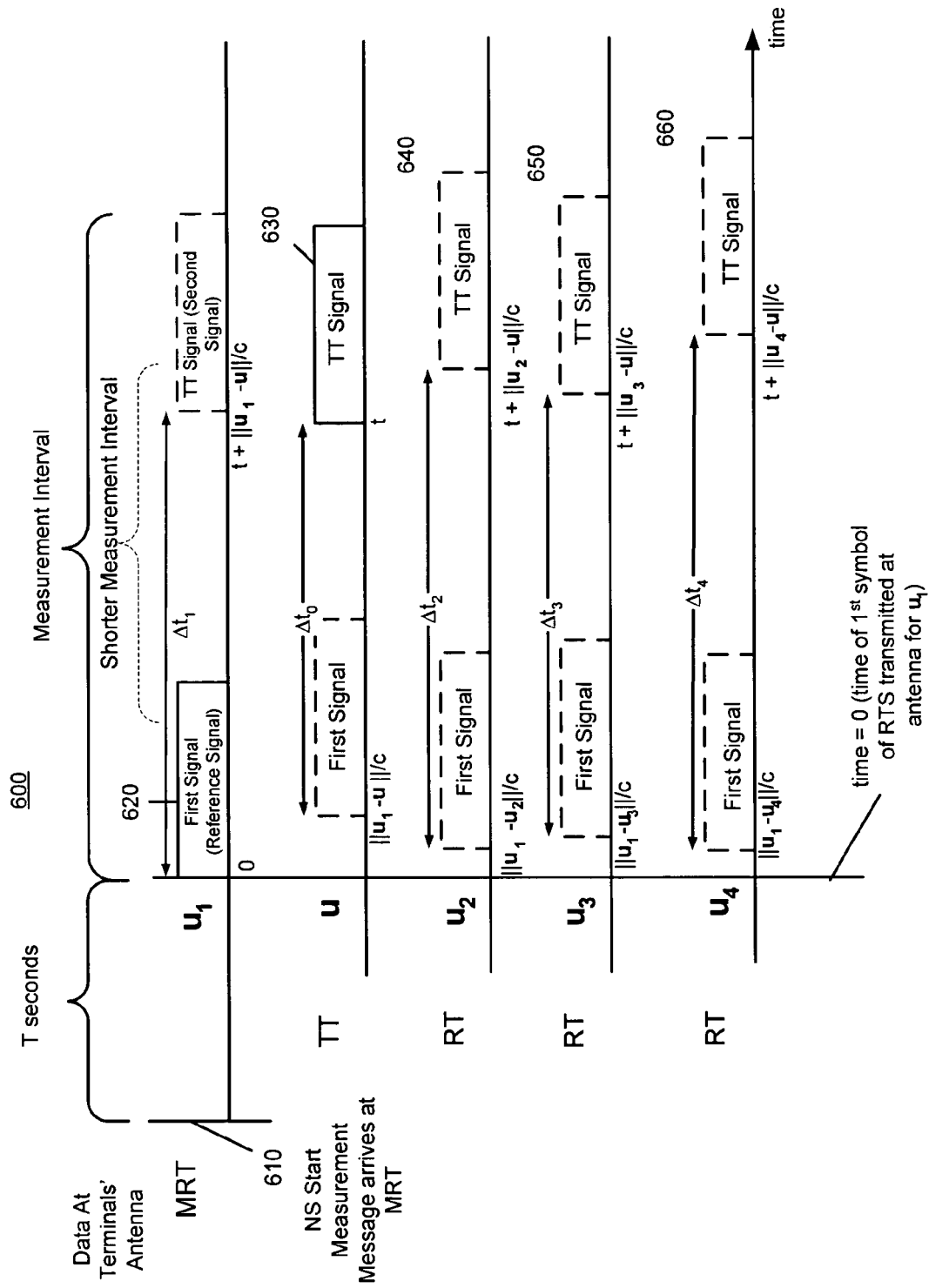
FIG. 6 is a timing diagram showing a process for collecting location measurement data to locate a target terminal (TT).

FIG. 6 illustrates a process 600 to obtain measurement data pertaining to the location of a TT in an environment such as that shown in FIG. 1. To facilitate understanding of FIG. 6, signals that are transmitted by a device are indicated in solid lines and signals that are received by a device are indicated in dotted lines. As many as four locations $u_1$–$u_4$ may be known at the NS, such as for the MRT and the other RTs. Initially, the NS identifies the appropriate RTs for the measurement process, and in step 610, sends a "start measurement" message to the MRT and RTs directing them to capture ADC receive signal data beginning at time T seconds from the arrival time of the NS message (T can be approximately 100 ms). The various techniques for dealing with periodic TT transmission and aperiodic TT transmissions are described above. The following description in conjunction with FIG. 6 assumes that the occurrence of the next TT can be predicted and the first signal is sent in advance of that transmission in the measurement experiment. It should be understood that if the terminal from where the first signal is transmitted is at an unknown location, then the "start measurement" message would be sent to that terminal and to the other RTs used in the measurement process.

Instead of starting the memory to capture at a fixed time after the NS "start measurement" message, the pre-store/ post-store features of the snapshot buffer 530 may be used in the RTs (thereby making it a variable trigger and reducing memory allocation requirements for the memory). The MAC logic detects the first signal (e.g., RTS), and in response issues a SB_TRIG signal that is coupled to the buffer to start post-storing samples.

Still another alternative is for the MRT, or other terminal that will send the first signal, to coordinate the measurement, instead of the NS, by sending the "start measurement" message to the RTs to prepare for the measurement. One advantage of the "start measurement" technique is that if an RT or TT is relatively far from the MRT, the remote RT or TT will experience decreased signal-to-noise performance in correlating to the first signal. Therefore, if the RTs know in advance of an impending measurement, their memories can be activated before the first signal/second signal exchange, allowing sufficient capture of the data.

T seconds after the arrival time of the NS "start measurement" message at the MRT or other terminal that sends the first signal (advising the MRT and RTs of the impending measurement process), in step 620, the MRT sends a first signal. The first signal may be, for example, a request to send (RTS) packet used as part of the IEEE 802.11x communication standard assuming the RTs are 802.11x enabled. The MRT needs to note when the first signal was sent. One way to do this is to capture for storage in the memory the digital data representing the first signal that is supplied to the DAC input and when it was coupled to the DAC. Calibration for the delay from the input of the DAC to transmission from the antenna would be computed and many techniques to do this are known in the art, and therefore not described herein.

In step 630, the TT transmission (the second signal) occurs. As shown at reference numerals 640, 650 and 660, the MRT and RTs receive and store receive signal data associated with the first and second signals in their memories.

FIG. 6 shows that the complete measurement interval extends from the beginning of a first signal to the beginning of the subsequent second signal. However, the measurement interval need not be this long. A shorter measurement interval may extend from just before the end of the first signal to just beyond the beginning of the subsequent second signal. Using this shorter measurement interval approach, the Δt that is measured is from a reference point (e.g., the end) of the first signal to a reference point (e.g., the beginning) of the second signal at the MRT and each RT. The advantage of this measurement interval is that less data storage in the memory is required, which, among other things, reduces the memory allocation requirements.

FIGS. 7 and 8 show how to locate a TT 100 that does not operate with the same communication standard as the MRT 230 or other terminal that sends the first signal, useful for the reasons described above in conjunction with FIG. 2. For example, if the MRT 230 uses the IEEE 802.11 communication protocol, the TT 100 may be any non-802.11 device. The TT 100 may be a device that transmits periodically or aperiodically. The approximate transmit behavior (periodic or aperiodic) of the TT 100 is determined by listening at an RT to the TT's transmissions over time. For example, the TT 100 may be a cordless phone, Bluetooth™ device, etc. that transmits periodically. Some cordless phones transmit periodically approximately every 10 ms. FIG. 7 shows the transmission behavior of a TT that transmits periodically, and FIG. 8 shows the transmission behavior of a TT that transmits aperiodically.

Techniques to detect a periodic signal are disclosed in the aforementioned co-pending application related to a spectrum analysis engine. When the transmit behavior of the TT (through signal classification or other techniques) can be determined, then the signaling technique used to locate that TT can be adjusted accordingly.

For example, if it is determined that the TT has periodic transmission behavior and its transmit timing is determined, the first signal may be sent immediately before or after the TT's transmission, allowing the RTs to capture in their memories both the first signal and the second signal transmitted by the TT 100. Because the TT is periodic, the NS or MRT 230 (or other terminal) knows when to alert the RTs of an impending measurement cycle. FIG. 7 shows that the first signal is transmitted just before the TT's transmission so that the measurement interval may extend from just before the MRT transmission to just after the TT transmission. The TDOA information with respect to the MRT's first signal and the TT's second signal at two or more known locations is obtained in a manner similar to that described above. The computations referred to above in connection with FIG. 6 (and described in more detail hereinafter) may then be performed in a similar manner to determine the location of the TT 100.

With reference to FIG. 8, if the TT 100 is determined to have an aperiodic transmission behavior, the first signal may be a periodic signal, such as any sync signal or pulse used by many communication standards that all RTs will receive as well as the TT's signal. For example, the IEEE 802.11 standard employs a Beacon interval to alert unassociated devices about the existence of a network. Even though the TT's transmission time may not be predictable, there will inevitably be a time interval where the periodic first signal will precede or follow the TT's transmission, sufficient to allow the RTs to obtain TDOA measurements. Also, using a periodic first signal allows the NS or MRT (or other terminal) to predict when a measurement interval will occur in order to alert the RTs of it so they know when to begin capturing data. On the other hand, if the terminal sending the first signal has the ability to communicate with the TT using the TT's communication protocol, then the terminal (e.g., MRT 230) can, for example, transmit a packet that the TT responds to with an ACK packet, and this exchange can be used to capture TDOA measurements at the RTs.

In the event that the correlation processes are performed at the NS, the RTs may send their captured receive signal data to the NS (either by wired or wireless link). If the RTs perform the correlation process locally, they send (either by wired or wireless link) the computed values $\{\Delta t_i\}$ to the NS.

If the first signal is sent by a terminal at a known location, such as the MRT, then the MRT uses a similar technique and reports $\Delta t_1$ to the NS (or sends the captured receive signal data necessary for the NS to compute $\Delta t_1$). $\Delta t_1$ is the difference in arrival time between the second signal the MRT receives from the TT and the first signal that the MRT transmitted from one of its antennas.

Using $\Delta t_i$, i=1, ..., 4, and the known location of the RTs (and optionally the MRT), the NS computes the location of the TT by solving the following equation for u and t:

$$\|u_i-u\|-\|u_i-u_1\|+c(t-\Delta t_i)=0, i=1,\ldots,4 \tag{1}$$

where c is the speed of light, and t is the time of the transmission by the TT.

There are many approaches known in the art for solving equation (1). Turning to FIG. 9, one approach involves finding the zero p* of a multi-dimensional, non-linear function F(p) of 4 variables p=[x, y, z, t]. For ranging measurements, one approach is to linearize F(p) about $p_k$ as follows:

$$F(p_k+p)>>F(p_k)+J(p_k)p,$$

where $J(p_k)$ is the Jacobian of F evaluated at $p_k$, and then to use a Newton iteration to solve F(p)=0:

$$p_{k+1}=p_k-J(p_k)^{-1}F(p_k) \tag{2}$$

The Jacobian of F for equation (1) is shown in FIG. 9. A single location solution is produced using this iterative approach.

To produce a measurement accuracy of 1 m or better, a total system timing error of at most 3 ns is desirable. The NS may take into account geometrical dilution of precision (GDOP) due to ill-conditioned Jacobian matrices. The standard deviation of the range estimate due to GDOP can be shown to be s=1/sqrt(trace($J^TJ$)). If the NS determines that the range variance is too large, it may repeat the experiment using a different set of RTs to improve the precision. It should be noted that the entire RTS and CTS packets need not be processed, so long as enough of the packets are processed in order to achieve the desired SNR.

Another approach to solving equation (1) is a closed-form approach which produces two candidate solutions for the location of the TT. Many closed form approaches are known in the art. An example of a closed-form approach is described in the paper *Processing of Pseudorange Measurements: An Exact and Iterative Algorithm for the GPS Single Point Positioning,* N. Crocetto et al., Proceedings of the Workshop International Cooperation and Technology Transfer—ISPRS Commission VI, Working Group 3, Perugia, 16–20 Feb. 1998, pp. 134–141, the entirety of which is incorporated herein by reference. Techniques for selecting one of the two candidate locations produced by a closed-form approach are described hereinafter in conjunction with FIG. 11.

The accuracy of the measurements may be improved by determining the frequency error of the MRT clock. One way to improve the frequency error is for the NS to send to the MRT start count and stop count signals separated by a fixed time period for several iterations to determine the frequency error in PPM of the MRT clock. All of the time measurements (at the RTs) are made relative to the MRT clock whose frequency error is known. Other techniques to determine the frequency error of the MRT clock may also be known in the art.

The basic location measurement principles described above can be adapted for conditions under which TDOA measurements need to be made at only 3 or as few as 2 known locations. When one coordinate of the TT is known (e.g., a vertical position for same-floor measurements), TDOA measurements at only 3 known locations are required to solve equations (1) & (2) since the z-coordinate of the position vector u is known.

Furthermore, when the TT is a collaborative device and a 3-D position measurement is desired, TDOA measurements at only 3 known locations are needed. A collaborative TT can capture received signal data to enable a TDOA measurement, e.g., $\Delta t_0 = t - \|u - u_1\|/c$, and that TDOA measurement can be included in the computation of equation (1), where $\Delta t_0$ is the TDOA measurement derived from the data captured at the TT (assuming in this example that the MRT sends the first signal). This provides one additional equation to the system of equations.

There are also conditions under which TDOA measurements at only 2 known locations are required to make a location measurement. This is the case, for example, when one coordinate of the TT is known (e.g., its vertical position z) and the TT is a collaborative device (assuming again in this example that the MRT sends the first signal). Again, Table 1 above lists the various measurement possibilities depending on what information is available.

Resolving Location Ambiguity

There are actually 2 solutions to equation (1) for u since the solution to the system of equations consists of the intersection of two circles or three spheres.

Figure 10:
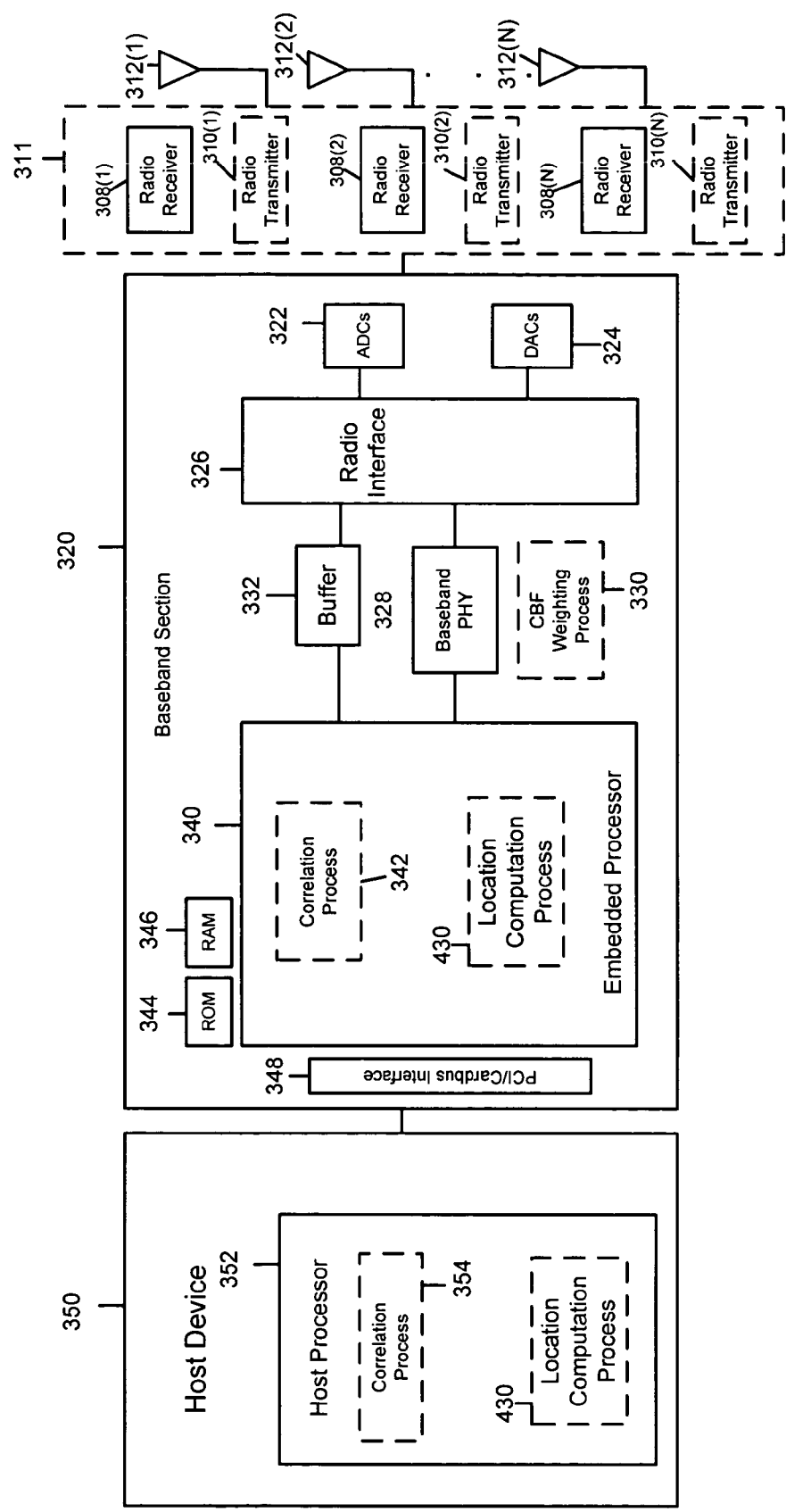
FIG. 10 is a block diagram of another type of terminal having multiple antennas that is useful for enhanced location measurement techniques.

FIG. 10 illustrates a block diagram of a terminal (MRT, RT and/or TT) useful in variations to the process shown in FIG. 6 and for performing a hypothesis test to resolve location ambiguity in solving equation (1). The block diagram of FIG. 10 is similar to that of FIG. 4, except that the terminal has multiple (e.g., 2 or more) antennas 312(1), 312(2) through 312(N) and multiple (e.g., 2 or more) radio receivers 308(1), 308(2) through 308(N) each of which can process a signal for a corresponding one of the antennas. If the RT is also an MRT or TT, it may include multiple radio transmitters 310(1), 310(2) to 310(N) associated with a corresponding antenna. One way to deploy multiple radio receivers and multiple radio transmitters is in a multiple-input multiple-output (MIMO) radio transceiver shown at reference numeral 311. In addition, there is an optional composite beamforming (CBF) process 330 in the baseband IC 320 that is used to generate and apply transmit weights to signals to be transmitted and receive weights to received signals. The CBF process is described in more detail in commonly assigned and co-pending U.S. application Ser. No. 10/174,728, filed Jun. 19, 2002, entitled "System and Method for Antenna Diversity Using Joint Maximal Ratio Combining"; U.S. application Ser. No. 10/174,689, filed Jun. 19, 2002, entitled "System and Method for Antenna Diversity Using Equal Gain Joint Maximal Ratio Combining"; U.S. application Ser. No. 10/064,482, filed Jul. 18, 2002, entitled "System and Method for Joint Maximal Ratio Combining Using Time Domain Signal Processing", the entirety of all of which are incorporated herein by reference. Briefly, the CBF process computes and applies transmit weights against component signals (of one or more transmit signal(s)) that are sent simultaneously via individual antennas to another device. Likewise, the CBF process computes and applies receive weights against component signals (of one or more receive signals(s)) that are received via individual antennas from another device. An example of a MIMO radio transceiver is disclosed in commonly assigned co-pending U.S. application Ser. No. 10/065,388, filed Oct. 11, 2002, and entitled "Multiple-Input Multiple-Output Radio Transceiver", the entirety of which is incorporated herein by reference. If each of the MRT, RT and TT are beamforming-capable, then the measurement process shown in FIG. 6 may be repeated multiple times using different transmit weights at the MRT (when transmitting the first signal) and TT (when transmitting the second signal) to mitigate the effects of multi-path. Moreover, a device having multiple antennas and multiple receivers can compute the relative amplitude and phase of a signal (e.g., the first signal and the second signal) received by each of the antennas.

Figure 11:
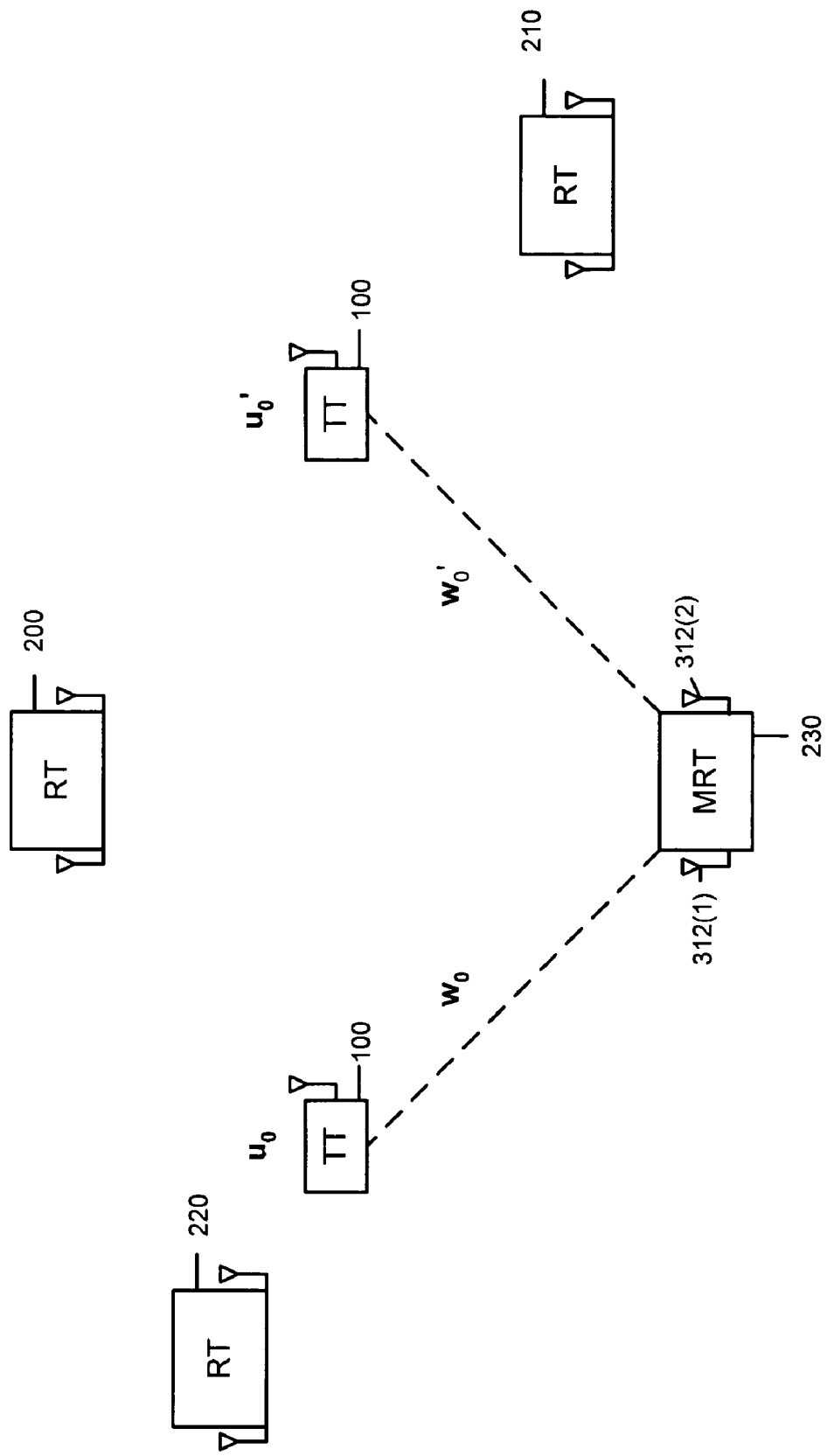
FIG. 11 is a block diagram showing one of two possible positions of the TT with respect to a reference terminal (RT).

There are known closed-form solutions to equation (1) that produce two candidate positions, referred to as positions $u_0$ and $u_0'$, of the TT. With reference to FIG. 11, a hypothesis test is described to select the proper one of the two solutions to equation (1) using an MRT 230 with multiple antennas (such as two antennas) 312(1) and 312(2). The MRT 230 generates two transmit antenna vectors $w_0$ and $w_0'$ associated with its antennas, vector $w_0$ to point a beam to position $u_0$ and vector $w_0'$ to point a beam to position $u_0'$. The MRT 230 then selects the position that produces the highest received signal strength as seen through the corresponding antenna beam. Specifically, if the location of the MRT is $u_1$, then the MRT computes the quantity $|<u_1, w_0>|/[\|u_1\| \|w_0\|]$ and the quantity $|<u_1, w_0'>|/[\|u_1\| \|w_0'\|]$. If the quantity for $w_0$ is greater, then $u_0$ is the solution, otherwise, $u_0'$ is solution. Techniques to generate weights that direct a beam from a multiple antenna (or antenna array) device to a particular location are well known in the art, and are therefore not described herein. For some situations (e.g., when the location is perpendicular to the MRT's antennas), this angle of arrival technique may not work, but there are several other techniques known in the art (and thus not described herein) that can be used to resolve the proper location from the two solutions.

Another technique for selecting the correct one of the candidate positions $u_0$ or $u_0'$ is described, again with reference to FIGS. 10 and 11. According to this technique, the position of the TT is modeled to be a random vector U that can take on either position $u_0$ or $u_0'$ with equal probability. Some basic definitions and assumptions follow. There are N RTs, individually denoted $RT_i$ for i=1 to N. Each RT has a plurality of antennas to at least receive signals, and specifically the capability to store data associated with the signal transmitted by the TT (referred to as the "second signal" above) and received at each of its plurality of antennas. The channel response between the plurality of antennas of the $RT_i$ and the TT depends on the position U of the TT. $H = \Gamma(U, u_i)$ is the candidate channel response vector between $RT_i$ and the TT at position U and is a function $\Gamma$ of U and $u_i$. Since U is random, H is a discrete random vector that is either $\Gamma(u_0, u_i)$ or $\Gamma(u_0', u_i)$. The distances between the TT antenna(s) at each candidate position $u_0$ and $u_0'$ and each antenna of $RT_i$ is known because, by definition, the position of the RT (and specifically each of the $RT_i$'s antennas) are known. Assuming a line-of-sight (LOS) channel between the TT and $RT_i$, the candidate channel response vectors $\Gamma(u_0, u_i)$, $\Gamma(u_0', u_i)$ for $RT_i$ can be computed using this information for the candidate positions $u_0$ and $u_0'$ of the TT. For non-LOS environments, the LOS channel is used as an estimate. $G=H+N=\Gamma(U,u_i)+N$, is the channel response (perturbed by estimated noise, assumed to be Gaussian) observed at $RT_i$ between the TT and $RT_i$ and is a discrete random vector that is a function of the position of the TT and the position of $RT_i$. The observed channel response vector $g_i$ for $RT_i$ can be determined from the (measured amplitude and phase of the) received second signal from the TT at each antenna j of $RT_i$, where j=1 to M. Each RT need not have the same number (M) of antennas.

Assuming the positions $u_0$ and $u_0'$ have or can be computed using the TDOA information described above, the NS gathers data for the observed channel response vectors at the RTs: $g_1=G(U, u_1), \ldots, g_N=G(U, u_N)$ from the data collection process described above in conjunction with FIG. 4. In addition, the NS computes the two candidate channel response vectors $\Gamma(u_0, u_i)$, $\Gamma(u_0', u_i)$ for each $RT_i$.

The NS selects as the TT position the position u that maximizes the conditional probability:

$$Pr(U = u | G_1 = g_1, \ldots, G_N = g_N) = \frac{f_{G|U}(g_1, \ldots, g_N | u) Pr(U = u)}{f_G(g_1, \ldots, g_N)}$$

over $u=\{u_0, u_0'\}$. The denominator can be ignored because it does not depend on the selection of $u_0$ or $u_0'$. The $Pr(U=u)$ factor in the numerator can be ignored because it is a constant 0.5. Therefore, maximizing the above expression over u is equivalent to maximizing:

$$f_{G|U}(g_1, \ldots, g_N | u) = f_{N|U}(g_1 - h_1, \ldots, g_N - h_N | u)$$

$$= f_N(g_1 - h_1, \ldots, g_N - h_N)$$

$$= K \cdot e^{-\left(\frac{\|g_1 - h_1\|^2}{2\sigma^2} + \ldots + \frac{\|g_N - h_N\|^2}{2\sigma^2}\right)}$$

This last equation follows because the noise N is assumed to be jointly Gaussian. Therefore, using this equation, maximizing the above probability over $\{u_0, u_0'\}$ is equivalent to selecting $u_0$ or $u_0'$ that minimizes the sum-of-squared Euclidean distances between the observed channel response vector $g_i$ and the candidate channel response vectors $h_i$, i.e., minimizes $\Sigma \|h_i - g_i\|^2 / 2\sigma^2$, for i=1 to N. For some applications, the NS may choose to use angle-of-arrival information only, discarding the distance information carried by g and h. In this case, the NS may normalize vectors $g_i$ and $h_i$ such that $|h_{i,j}|=|g_{i,j}|=1$, for i=1 to N, and j=1 to M, and thus ignore the amplitude relationship in $g_i$ and $h_i$ and use only the phase relationship (for angle-of-arrival only). When the vectors $g_i$ and $h_i$ are not normalized, the RTs that are closer to the actual position of the TT contribute more to the sum than without normalization.

Again with reference to FIGS. 10 and 11, still another technique to resolve location ambiguity is based on angle-of-arrival (e.g., phase) information obtained at each of the RTs involved in the location measurement. For example, if an RT has multiple antennas, the RT can generate relative phase information at each antenna when receiving the second signal from the TT at each antenna. Using the phase information at each RT, a confidence score can be assigned to the two candidate locations $u_0$ or $u_0'$ for the perspective of that RT. The confidence score may be a "soft" decision that varies between two values (e.g., −1, to 1) or a hard decision (e.g., 0 or 1). The confidence scores for all RTs are summed to produce a total score to select one of the two candidate positions as the actual position of the TT.

There is another variation when the MRT or TT has multiple antennas, similar to the block diagram shown in FIG. 10. In order for the MRT to measure the transmit time of the first signal (if the MRT is the terminal that transmits the first signal), the MRT may use one antenna path to transmit the first signal, and use another path to simultaneously receive the first signal and store the ADC samples of the first signal it in its memory. Similarly, the TT may use one antenna path to transmit the second signal, and use another path to simultaneously receive the second signal, and store the ADC samples of it in its memory. Alternatively, the TT may store in its memory the digital input to its DAC that are used to transmit the second signal.

Figure 12:
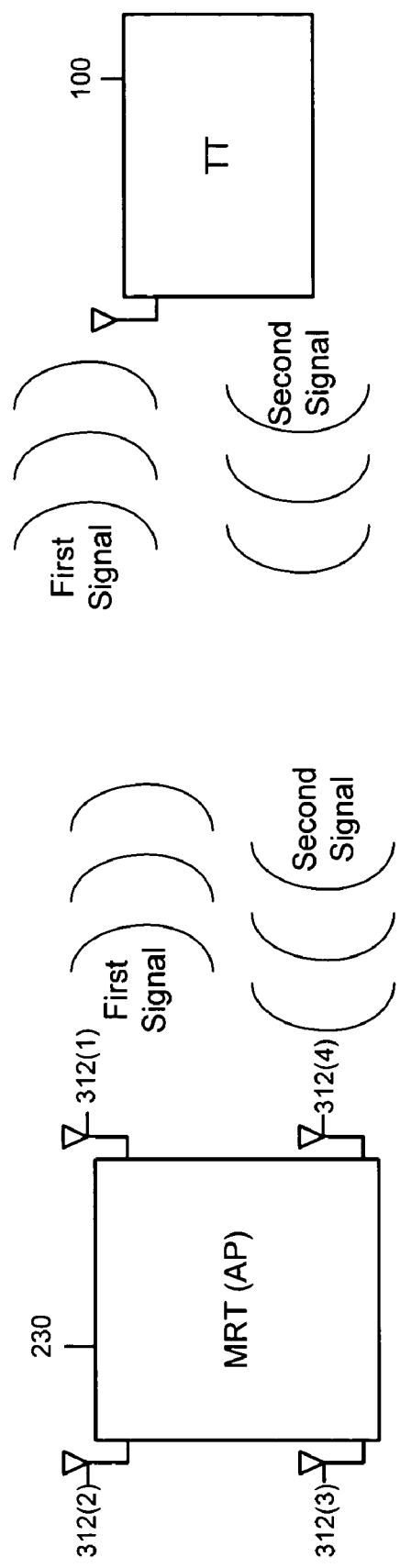
FIGS. 12 and 13 are block diagrams of other location measurement configurations possible with the use of terminals having multiple antennas.
Figure 13:
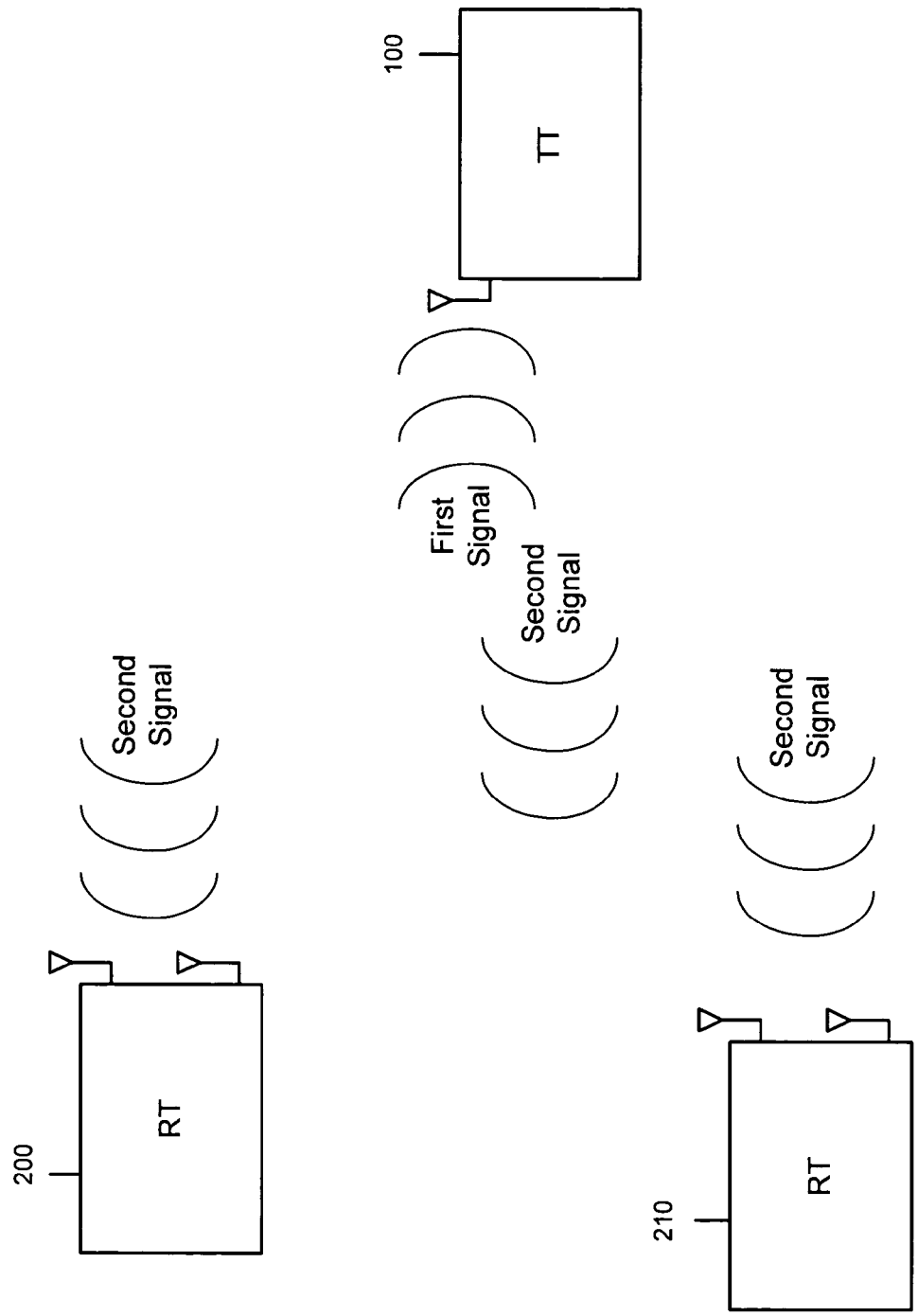

FIGS. 12 and 13 illustrate other ways to obtain reference time difference of arrival measurements in order to perform the location computations described above in conjunction with FIG. 6. Again, reference is made to Table 1 above. In FIG. 12, an RT, such as the MRT 230, has at least four antennas 312(1), 312(2), 312(3) and 312(4) and multiple radio receivers, giving it the ability to detect the second signal separately at each antenna, as described above in conjunction with FIG. 10. The time of arrival measurements at each of the antennas of the MRT may be used to perform the measurement computations. Under these conditions, no other RT is needed for the measurement process. In FIG. 13, there are one or two RTs 200 and 210 each having two antennas. The TDOA measurements at each of the two antennas of each RT (for a total of up to four measurements) can be obtained and used for the location computations.

In FIGS. 12 and 13, as explained in Table 1, if one coordinate (e.g., the vertical position (z)) of the TT is known and the TT is a collaborative device, then the measurements at each of two antennas of an RT can be obtained and used to compute the remaining two coordinates (e.g., x and y). Consequently, TDOA measurements can be obtained all at a single device. Moreover, the MRT 230 may also transmit the first signal used in the measurement process using one of its two or more antennas, and it can receive the first signal at each of its other two or more antennas where the second signal from the TT will also be received. Thus, the entire location measurement process can be initiated from a single device. Further still, that single device, e.g., MRT 230, may have capability to execute both the correlation process and the location computation process locally such that the TDOA measurements can be obtained and the location of the TT computed at a single device. Alternatively, a multiple antenna RT (e.g., MRT) can send captured receive signal data or the TDOA data to the NS where the necessary computations are made.

FIG. 14 shows an example of a coverage map that can be generated using the location measurement techniques described herein. The coverage map integrates the locations of multiple devices into a visual display of an area, such as an office space. The coverage map may show the locations of APs and STAs as well as areas of no coverage and areas of interference.

There are many applications of the location measurement techniques described herein. One application is to locate devices associated with problems or security breaches, which have particular utility in large multiple-AP enterprise type WLANs. For example, if a device is determined to be operating without authority in a WLAN, its location can be determined to disable that device. A WLAN AP could attempt to go active in an existing WLAN environment using an identifier, such as a service set identifier (SSID) that is not authorized. When such an AP begins transmitting, its SSID can be captured and compared against a database of valid SSIDs to determine whether it is a valid AP. If it is not a valid AP, then its location can be determined to disable it. Similarly, if another device, such as a fraudulent STA associates with a STA masquerading as a valid STA using the MAC address of a valid STA, techniques can be used to determine if its signal pulse profile matches the signal pulse profile of the valid STA (based on stored data). When there is a mismatch, then the fraudulent STA can be located and disabled.

Still another application is to use device location as an indicator of whether the device is a valid or authorized device. For example, a so called "parking lot" attack on a WLAN occurs when a device outside the normal perimeter of a building associates with a WLAN inside a building or premises, possibly breaching security to a wired network server. The location of all devices in a WLAN can be tracked. If a device is outside a predetermined boundary, an alert can be generated that indicates a possible unauthorized device receiving signals on the WLAN. FIG. 14 shows an example for displaying on a coverage map an icon where a device has been detected outside a boundary indicated at reference numeral 1000. Actions can be taken to disable that device. It is further possible that a device may be permitted to roam further from the normal coverage area of the WLAN if it can supply a suitable password or authorization code (that matches a code in a database) in response to an request sent to the device when it is determined that its location is outside the predetermined boundary. Still another application of location measurement is to detect when there is an unauthorized user obtaining access to a WLAN from a location outside of an authorized region.

Similarly, the location a source of interference (of any signal type) can be located using the techniques described herein. For example, a denial-of-service attack on a wireless network may take the form of a powerful noise signal being emitted. The source of that emitter can be located using these techniques. Another example is determining the location of an interfering signal. To a WLAN, an interfering signal may be any non-WLAN signal that transmits on a periodic or aperiodic basis. When the interference or noise source is located, actions can be taken to avoid that area by other devices, or to disable the noise or interference source.

In summary, a method for determining a location of a source of a wireless radio signal comprising steps of: receiving the wireless radio signal at a plurality of known locations to generate receive signal sample data representative thereof at each known location; using the receive signal sample data obtained at one of the known locations as a reference waveform, determining the time of arrival of the wireless radio signal at each of the known locations; computing the time difference between the time of arrival of the wireless radio signal and time of arrival of a reference signal at each of the known locations; and determining a location of the source of the wireless radio signal based on the time difference of arrival measurements at the plurality of known locations.

Also provided is a method for determining a location of a radio device based on a first time difference between arrival of a first signal at a first known location and arrival of a second signal transmitted by the radio device at the first known location, and at least a second time difference between arrival of the first signal at a second known location and arrival of the second signal at the second known location, where samples of the second signal received at one of the first and second known locations are used as a reference waveform to correlate to the second signal in order to determine time of arrival of the second signal.

Similarly, a system is provided for determining the location of a target device that transmits a wireless radio signal, comprising: a plurality of radio devices that act as reference terminals and receive radio signals at corresponding known locations; and a computing device (e.g., a server) coupled to the plurality of radio devices that computes a location of the source of the wireless radio signal based on time differences between arrival of the wireless radio signal and a reference signal at each of the radio devices, wherein arrival of the wireless radio signal at each of the radio devices is determined using receive signal sample data of the wireless radio signal at one of the radio devices as a reference waveform. Each of the reference terminals has, among other components, a radio receiver and a memory to store the data associated with their reception of the signals to enable determination of the precise time of arrival of the signals.

Furthermore, a processor readable medium is provided that is encoded with instructions that, when executed by a processor, cause the processor to compute a location of a radio device based on a first time difference between arrival of a first signal at a first known location and arrival of a second signal transmitted by the radio device at the first known location, and at least a second time difference between arrival of the first signal at a second known location and arrival of the second signal at the second known location, where samples of the second signal received at one of the first and second known locations are used as a reference waveform to correlate to the second signal in order to determine time of arrival of the second signal.

The above description is intended by way of example only.

What is claimed is:

1. A method for determining a location of a source of a wireless radio signal comprising steps of:
   a. receiving the wireless radio signal at a plurality of known locations to generate receive signal sample data representative thereof at each known location;
   b. using the receive signal sample data obtained at one of the known locations as a reference waveform for correlation against the receive signal sample data associated with reception of the wireless radio signal at the other known locations in order to determine the time of arrival of the wireless radio signal at each of the other known locations;
   c. computing the time difference between the time of arrival of the wireless radio signal and time of arrival of a reference signal at each of the known locations; and
   d. determining a location of the source of the wireless radio signal based on the time difference of arrival measurements at the plurality of known locations.

2. The method of claim 1, and further comprising the step of generating data associated with reception of the wireless radio signal at each known location, the data including one or more of bandwidth, duration, center frequency and signal strength.

3. The method of claim 2, and further comprising the step of comparing the data associated with reception of the wireless radio signal received at each known location to determine the known location that best receives the wireless radio signal, and wherein the receive signal sample data at the known location that best receives the wireless radio signal is used for the reference waveform.

4. The method of claim 1, and further comprising transmitting the receive signal sample data describing the reference waveform to each of the other known location to enable determination of the time of arrival at those known locations of the wireless radio signal.

5. The method of claim 2, wherein the step of comparing comprises comparing the received signal strength of the wireless radio signal at each of the known locations and selecting as the reference waveform the receive signal sample data at the known location with the strongest received signal strength.

6. The method of claim 1, and further comprising the steps of transmitting the reference signal, and receiving the reference signal at each of the known locations.

7. The method of claim 6, and further comprising the step of transmitting the reference signal from a first known location.

8. The method of claim 7, and further comprising the step of determining that transmissions of the wireless radio signal occur periodically, and wherein the step of transmitting comprises transmitting the reference signal prior to a transmission of the wireless radio signal.

9. The method of claim 7, and further comprising the step of determining that transmissions of the wireless radio signal occur periodically, and wherein the step of transmitting comprises transmitting the reference signal after a transmission of the wireless radio signal.

10. The method of claim 7, and further comprising the step of determining that transmissions of the wireless radio signal occur aperiodically, and further comprising the step of transmitting the reference signal periodically in an attempt to cause a transmission of the reference signal to occur just prior to or after a transmission of the wireless radio signal.

11. The method of claim 7, and further comprising the step of determining that transmissions of the wireless radio signal occur aperiodically, and further comprising steps of transmitting the reference signal periodically, and continuously storing receive signal data at each of the known locations in a circular buffer in an attempt to capture at least one occurrence of a transmission of the wireless radio signal preceded by or followed by the reference signal.

12. The method of claim 7, and further comprising the step of determining that transmissions of the wireless radio signal occur aperiodically, and further comprising steps of transmitting the reference signal periodically, and at each known location triggering the capture of receive signal sample data for a period of time in response to detecting a transmission of the wireless radio signal.

13. The method of claim 1, and further comprising the steps of transmitting the reference signal from a first known location in response to receiving a transmission of the wireless radio signal at the first known location, and transmitting to each of the other known locations data describing the time delay at the first known location between the reception of the transmission of the wireless radio signal and transmission of the reference signal to enable the determination of the time difference of arrival at the other known location between the wireless radio signal and the reference signal.

14. The method of claim 13, wherein the step of transmitting the reference signal comprises transmitting a probe request signal in accordance with an IEEE 802.11 communication standard.

15. The method of claim 7, wherein the step of transmitting comprises transmitting the reference signal multiple times from multiple antennas of a device, each time using different transmit antenna weights.

16. The method of claim 1, wherein the step of determining produces first and second candidate locations for the target device, and further comprising the step of selecting one of the first and second candidate locations as the actual location of the target device.

17. The method of claim 16, wherein the step of selecting comprises:
  a. computing an observed channel response between the target device and a plurality of antennas at each of the first and second known locations based on the second signal received at the plurality of antennas at each of the first and second known locations;
  b. computing candidate channel responses between the plurality of antennas for each of at least the first and second known locations and each of the first and second candidate locations; and
  c. choosing one of the first and second candidate locations that minimizes a sum-of-squares Euclidean distance between the observed channel response and the candidate channel responses for the first and second known locations, respectively.

18. The method of claim 17, wherein the step of selecting further comprises the step of normalizing the observed channel response and the candidate channel responses to unity.

19. The method of claim 18, wherein the step of selecting comprises steps of generating for each of the first and second known locations, a measure of confidence that one of the candidate locations is the actual location based on angle-of-arrival of the second signal from the target device; and combining the measures of confidence for at least the first and second known locations to select the candidate location with the greatest total measure of confidence.

20. A system for determining the location of a target device that transmits a wireless radio signal, comprising:
  a. a plurality of radio devices that receive radio signals at corresponding known locations; and
  b. a computing device coupled to the plurality of radio devices that computes a location of the source of the wireless radio signal based on time differences between arrival of the wireless radio signal and a reference signal at each of the radio devices, wherein arrival of the wireless radio signal at each of the radio devices is determined using receive signal sample data of the wireless radio signal at one of the radio devices as a reference waveform for correlation against the receive signal sample data associated with reception of the wireless radio signal at the other known locations in order to determine the time of arrival of the wireless radio signal at each of the other known locations.

21. The system of claim 20, wherein each of the radio devices receives the wireless radio signals and generates receive signal sample data representative thereof, and wherein the computing device selects as the reference waveform one of receive signal sample data from the radio devices.

22. The system of claim 20, wherein the computing device or the respective radio devices correlate receive signal sample data associated with the reference waveform to determine time of arrival of the wireless radio signal at each radio device.

23. The system of claim 20, wherein each of the radio devices generates data describing characteristics associated with its reception of the wireless radio signal, the data including one or more of bandwidth, duration, center frequency and signal strength.

24. The system of claim 23, wherein the computing device compares one or more of the data associated with reception of the wireless radio signal at each of the radio devices to select receive signal sample data as the reference waveform.

25. The system of claim 23, wherein the computing device selects the receive signal sample data at the radio device with the strongest received signal strength.

26. The system of claim 22, wherein the computing device sends the receive signal sample data that is selected as the reference waveform to each of the other radio devices, wherein each of the radio devices use the reference waveform to determine the time arrival of the wireless radio signal and to compute the time difference of arrival between the reference waveform and the wireless radio signal.

27. The system of claim 20, wherein a first radio device transmits the reference signal.

28. The system of claim 27, wherein when it is determined that transmissions of the wireless radio signal occur periodically, the first radio device transmits the reference signal prior to a transmission of the wireless radio signal.

29. The system of claim 27, wherein when it is determined that transmissions of the wireless radio signal occur periodically, the first radio device transmits the reference signal after a transmission of the wireless radio signal.

30. The system of claim 27, wherein when it is determined that transmissions of the wireless radio signal occur aperiodically, the first radio device transmits the reference signal periodically in an attempt to cause a transmission of the reference signal to occur just prior to or after a transmission of the wireless radio signal.

31. The system of claim 27, wherein when it is determined that transmissions of the wireless radio signal occur aperiodically, the first radio device transmits the reference signal periodically and the radio devices continuously store receive signal data in a circular buffer in an attempt to capture at least one occurrence of a transmission of the wireless radio signal preceded by or followed by the reference signal.

32. The system of claim 27, wherein when it is determined that transmissions of the wireless radio signal occur aperiodically, the first radio device transmits the reference signal periodically and the radio devices begin capturing receive signal sample data for a period of time in response to detecting a transmission of the wireless radio signal.

33. The system of claim 27, wherein the first radio device transmits the reference signal in response to receiving a transmission of the wireless radio signal.

34. The system of claim 33, wherein the first radio device or the computing device sends to each of the other radio devices data describing the time delay between reception of the transmission of the wireless radio signal at the first radio device and transmission of the reference signal by the first radio device to enable the determination of the time difference of arrival at the other radio devices between the wireless radio signal and the reference signal.

35. The system of claim 20, wherein each of the radio devices comprises a buffer memory that stores receive signal sample data associated with reception of the reference signal and associated with reception of the wireless radio signal from which time difference of arrival of those signals is determined.

36. The system of claim 27, wherein the first radio device transmits as the reference signal a request-to-send (RTS) signal.

37. The system of claim 27, wherein the first radio device transmits as the reference signal a probe request frame in accordance with an IEEE 802.11 communication standard, and wherein the other radio devices are capable of receiving and recognizing the probe request signal.

38. A method for determining a location of a radio device based on a first time difference between arrival of a first signal at a first known location and arrival of a second signal transmitted by the radio device at the first known location, and at least a second time difference between arrival of the first signal at a second known location and arrival of the second signal at the second known location, where samples of the second signal received at one of the first and second known locations are used as a reference waveform to correlate to the second signal in order to determine time of arrival of the second signal.

39. A processor readable medium encoded with instructions that, when executed by a processor, cause the processor to compute a location of a radio device based on a first time difference between arrival of a first signal at a first known location and arrival of a second signal transmitted by the radio device at the first known location, and at least a second time difference between arrival of the first signal at a second known location and arrival of the second signal at the second known location, where samples of the second signal received at one of the first and second known locations are used as a reference waveform to correlate to the second signal in order to determine time of arrival of the second signal.

40. The processor readable medium of claim 39, and further comprising instructions encoded on the medium for comparing data associated with reception of the second signal at the first and second known locations to determine the known location that best receives the second signal, and wherein the receive signal sample data at the known location that best receives the second signal is used for the reference waveform.

* * * * *